(12) United States Patent  (10) Patent No.: US 10,088,788 B2
Yun  (45) Date of Patent: Oct. 2, 2018

(54) IMAGE FORMING APPARATUS SUPPORTING NEAR FIELD COMMUNICATION (NFC) FUNCTION AND METHOD OF PROVIDING USER INTERFACE (UI) SCREEN CUSTOMIZED TO NFC DEVICE

(71) Applicant: S-Printing Solution Co., Ltd., Suwon-si, Gyeonggi-do (KR)

(72) Inventor: Tae-jung Yun, Seoul (KR)

(73) Assignee: S-Printing Solution Co., Ltd., Suwon-si (KR)

( * ) Notice: Subject to any disclaimer, the term of this patent is extended or adjusted under 35 U.S.C. 154(b) by 286 days.

(21) Appl. No.: 14/172,269

(22) Filed: Feb. 4, 2014

(65) Prior Publication Data

US 2015/0007109 A1  Jan. 1, 2015

(30) Foreign Application Priority Data

Jun. 26, 2013  (KR) .................. 10-2013-0073977

(51) Int. Cl.
| | |
|---|---|
| *G06F 3/0481* | (2013.01) |
| *G03G 15/00* | (2006.01) |
| *G06F 21/35* | (2013.01) |
| *G06F 21/60* | (2013.01) |
| *H04N 1/00* | (2006.01) |
| *G06F 3/12* | (2006.01) |

(52) U.S. Cl.
CPC ....... *G03G 15/502* (2013.01); *G03G 15/5016* (2013.01); *G06F 21/35* (2013.01); *G06F 21/608* (2013.01); *H04N 1/00307* (2013.01); *G06F 3/1204* (2013.01); *G06F 3/1222* (2013.01); *G06F 3/1238* (2013.01); *G06F 3/1292* (2013.01); *G06F 2221/2115* (2013.01); *H04N 2201/006* (2013.01); *H04N 2201/0075* (2013.01); *H04N 2201/0094* (2013.01)

(58) Field of Classification Search
CPC .... G06F 3/1292; G06F 3/1209; G06F 3/1285; G06F 3/1238; G06F 3/1247
See application file for complete search history.

(56) References Cited

U.S. PATENT DOCUMENTS

| | | | | |
|---|---|---|---|---|
| 2009/0002751 | A1* | 1/2009 | Gha | H04M 1/7253 358/1.15 |
| 2013/0215467 | A1* | 8/2013 | Fein | G06F 3/1204 358/1.15 |
| 2013/0324169 | A1* | 12/2013 | Kamal | H04W 4/80 455/466 |
| 2014/0022587 | A1* | 1/2014 | Coccia | G01S 19/14 358/1.15 |
| 2015/0288835 | A1* | 10/2015 | Fein | G06F 3/1204 358/1.15 |

* cited by examiner

*Primary Examiner* — Namitha Pillai
(74) *Attorney, Agent, or Firm* — Jefferson IP Law, LLP

(57) ABSTRACT

An image forming apparatus supporting a near field communication (NFC) function identifies, if a user device having an NFC function is NFC-tagged, the user device by receiving identification information of the user device, and displays, when the user device is identified, a user interface (UI) corresponding to the identified user device.

11 Claims, 19 Drawing Sheets

<NFC enabled phone>

NFC tag

| Item | Value |
|---|---|
| Device Name | CLX-4170FW |
| Serial Number | 1234567890 |
| Print Capacity | Color, Mono |
| Scan Capacity | 300, 600 dpi |
| Fax Capacity | 33.6K bps |
| Network Address 1 | 0x0000f0a01234 |
| Network Address 2 | 169.254.12.13 |
| Location | N37.578868, E126.980564 |
| Administrator | Kim Jin Hyung (010-123-1234, j.h.Kim@samsung.com) |

IMAGE FORMING APPARATUS SUPPORTING NEAR FIELD COMMUNICATION (NFC) FUNCTION AND METHOD OF PROVIDING USER INTERFACE (UI) SCREEN CUSTOMIZED TO NFC DEVICE

CROSS-REFERENCE TO RELATED APPLICATIONS

This application claims the priority under 35 U.S.C. § 119 from Korean Patent Application No. 10-2013-0073977, filed on Jun. 26, 2013, in the Korean Intellectual Property Office, the disclosure of which is incorporated herein in its entirety by reference.

BACKGROUND OF THE INVENTION

1. Field of the Invention

One or more exemplary embodiments of the present general inventive concept relate to an image forming apparatus supporting a near field communication (NFC) function and a method of providing a user interface (UI) that is customized for an NFC device in the image forming apparatus.

2. Description of the Related Art

Near field communication (NFC) is a contactless short-range wireless communication standard between electronic devices within a short distance of 10 cm with low power consumption by using a frequency of 13.56 MHz, and was developed by the joint work of NXP Semiconductors of Netherlands and Sony of Japan in 2002. A data transfer rate of NFC is 424 Kbps, and NFC has excellent security due to high proximity and encryption technology. NFC forgoes a complicated pairing process of recognition of devices but allows devices to recognize one another within 1/10 second or less.

In particular, NFC is a smart card type contactless wireless communication technology where radio frequency identification (RFID) technology is utilized. In addition, NFC builds upon RFID technology by allowing two-way communication compared to smart cards. NFC has a relatively large memory storage space and offers more variety of services. Accordingly, commercialized electronic devices, such as smartphones and personal computers (PCs), in which the NFC technology is used, have recently been released.

SUMMARY OF THE INVENTION

One or more exemplary embodiments of the present general inventive concept provide an image forming apparatus supporting a near field communication (NFC) function and a method of providing a user interface (UI) that is customized for an NFC device in the image forming apparatus.

One or more exemplary embodiments of the present general inventive concept provide a non-transitory computer readable recording medium having a program to execute the method.

Additional features and utilities of the present general inventive concept will be set forth in part in the description which follows and, in part, will be obvious from the description, or may be learned by practice of the general inventive concept.

Exemplary embodiments of the present general inventive concept provide an image forming apparatus supporting a near field communication (NFC) function, the image forming apparatus including a user interface unit to display a first user interface (UI) providing menus related to an image job and image job options, an NFC module to receive identification information of a user device having the NFC function if the user device is NFC-tagged, and a control unit to identify the user device based on the received identification information, wherein when the user device is identified, the user interface unit converts the displayed first UI to a second UI corresponding to the identified user device.

When the user device is identified, the user interface unit may display the second UI by modifying a screen configuration of the menus displayed on the first UI to a screen configuration that is customized for the identified user device.

The displayed second UI may include a screen configuration where at least one of an arrangement, a shape, a language set up, and a backgrounds screen of the menus is modified from the first UI to be customized for the identified user device.

At least one menu among the menus displayed on the first UI may not be allowed for the identified user device. The displayed second UI may include a screen configuration in which the at least one menu that is not allowed for the identified user device is deactivated.

The displayed second UI may include a menu customized based on types of applications installed in the user device.

The applications installed in the user device may include a cloud application that provides a cloud function. The displayed second UI may include a menu to execute an operation of transmitting an image scanned by using the image forming apparatus to a cloud connected to the cloud application.

When the user device is identified, the user device may display on the second UI image job options that are customized for the identified user device.

The customized image job options may include options that restrict a usage range of the image job available in the identified user device.

The customized image job options may include options that set a target to which a result of the image job is to be transmitted as address book information stored in the identified user device.

When the user device is identified, the control unit may synchronize an application include in the identified user device with the image forming apparatus and the identified user device. The user interface unit may provide a menu on the second user interface to synchronize the application.

The identification information may include at least one of International Mobile Station Equipment Identity (IMEI), an Integrated Circuit Card Identifier (ICCID), a MAC address, an Internet Protocol (IP) address, a phone number, or a Personal Identification Number (PIN) of the user device. The control unit may identify the user device by comparing a list of identification information stored in advance in a storage unit included in the image forming apparatus or in an external server, with the received identification information.

Exemplary embodiments of the present general inventive concept also provide a near field communication (NFC) device supporting an NFC function, the NFC device including a user interface unit to display a first user interface (UI) of a printing application executed to perform an image job, an NFC module, if an image forming apparatus having the NFC function is NFC-tagged, to receive identification information of the NFC-tagged image forming apparatus, and a control unit to identify the image forming apparatus based on the received identification information, wherein when the image forming apparatus is identified, the user interface unit converts the displayed first UI to a second UI corresponding to the identified image forming apparatus.

When the image forming apparatus is identified, the user interface unit may display the second UI by modifying a screen configuration of the first UI to a screen configuration including menus that are customized for the identified image forming apparatus.

The displayed second UI may include a screen configuration where at least one of an arrangement, a shape, a language set up, and a background screen of the menus is modified from the first UI to be customized for the identified image forming apparatus.

When the user device is identified, the user interface unit may display image job options that are customized for at least one of the identified image forming apparatus and the user device on the second UI.

The customized image job options may include options that restrict a usage range of the image job available in the identified user device and options that set a target to which a result of the image job is to be transmitted as address book information stored in the user device.

Exemplary embodiments of the present general inventive concept also provide a method of providing a user interface (UI) screen that is customized for a near field communication (NFC) device in an image forming apparatus supporting an NFC function, the method including displaying a first user interface (UI) providing menus related to an image job and image job options, receiving, if a user device having the NFC function is NFC-tagged, identification information of the NFC-tagged user device, identifying the user device based on the received identification information, and converting, when the user device is identified, the displayed first UI to a second UI corresponding to the identified user device.

When the user device is identified, the second UI may be displayed by modifying a screen configuration of the menus displayed on the first UI to a screen configuration that is customized for the identified user device.

When the user device is identified, the second UI may be displayed and image job options customized for the identified user device are displayed on the second UI.

Exemplary embodiments of the present general inventive concept also provide a method of providing a user interface (UI) screen that is customized for an image forming apparatus in a near field communication (NFC) device supporting an NFC function, the method including displaying a first user interface (UI) of a printing application to execute an image job, receiving, if an image forming apparatus having the NFC function is NFC-tagged, identification information of the NFC-tagged image forming apparatus, identifying the image forming apparatus based on the received identification information, and converting, when the image forming apparatus is identified, the displayed first UI to a second UI corresponding to the identified image forming apparatus.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Figure 1A:
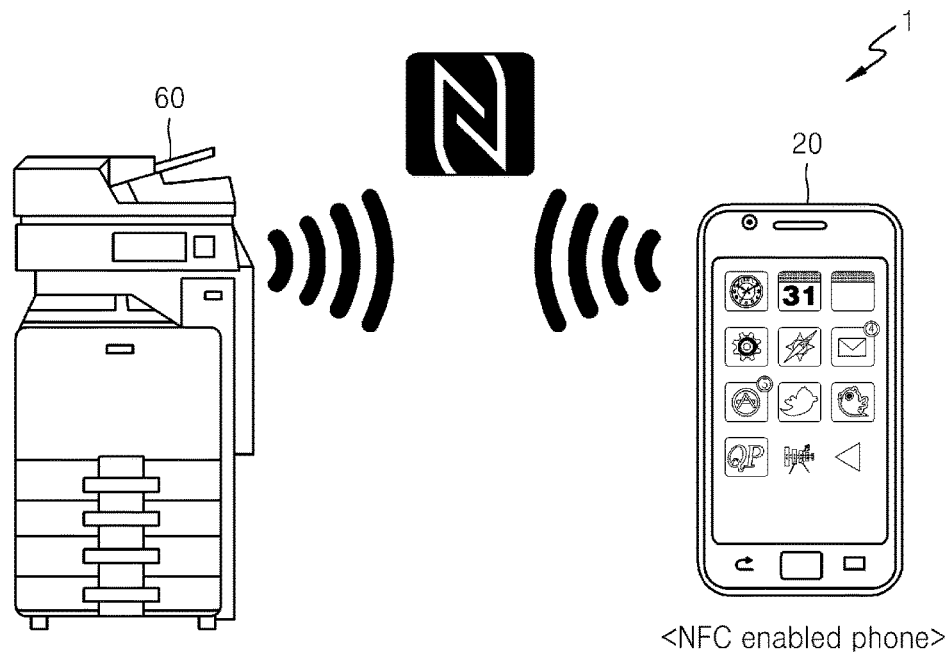
FIG. 1A illustrates a near field communication (NFC) environment according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. Expressions such as "at least one of," when preceding a list of elements, modify the entire list of elements and do not modify the individual elements of the list.

Figure 1B:
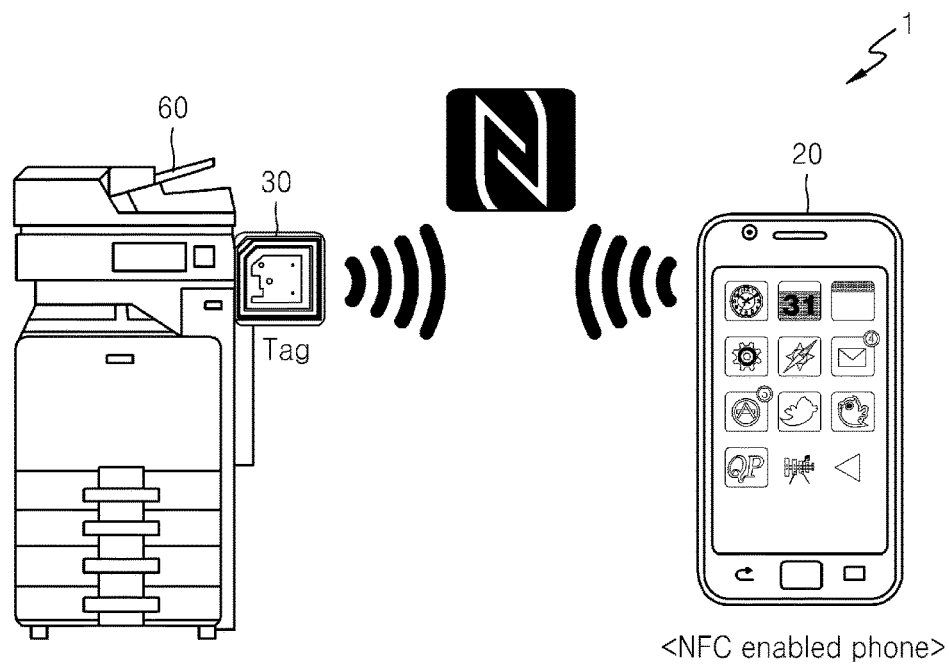
FIG. 1B illustrates an NFC environment which is similar to that of FIG. 1A, according to another exemplary embodiment of the present general inventive concept.

The exemplary embodiments of the present general inventive concept described herein relate to control of electronic apparatuses through a user device 20 (illustrated in FIGS. 1A-1B). An electronic apparatus may be any device which may be controlled with such a user device 20. This may include for example a display apparatus or an image forming apparatus 60 (illustrated for example in FIGS. 1A-1B). As used herein, an image forming apparatus 60 is an apparatus having an image forming function, including but not limited to a facsimile machine, a printer, a scanner, and a multi-function peripheral (MFP) combining multiple different image forming functions.

Figure 1C:
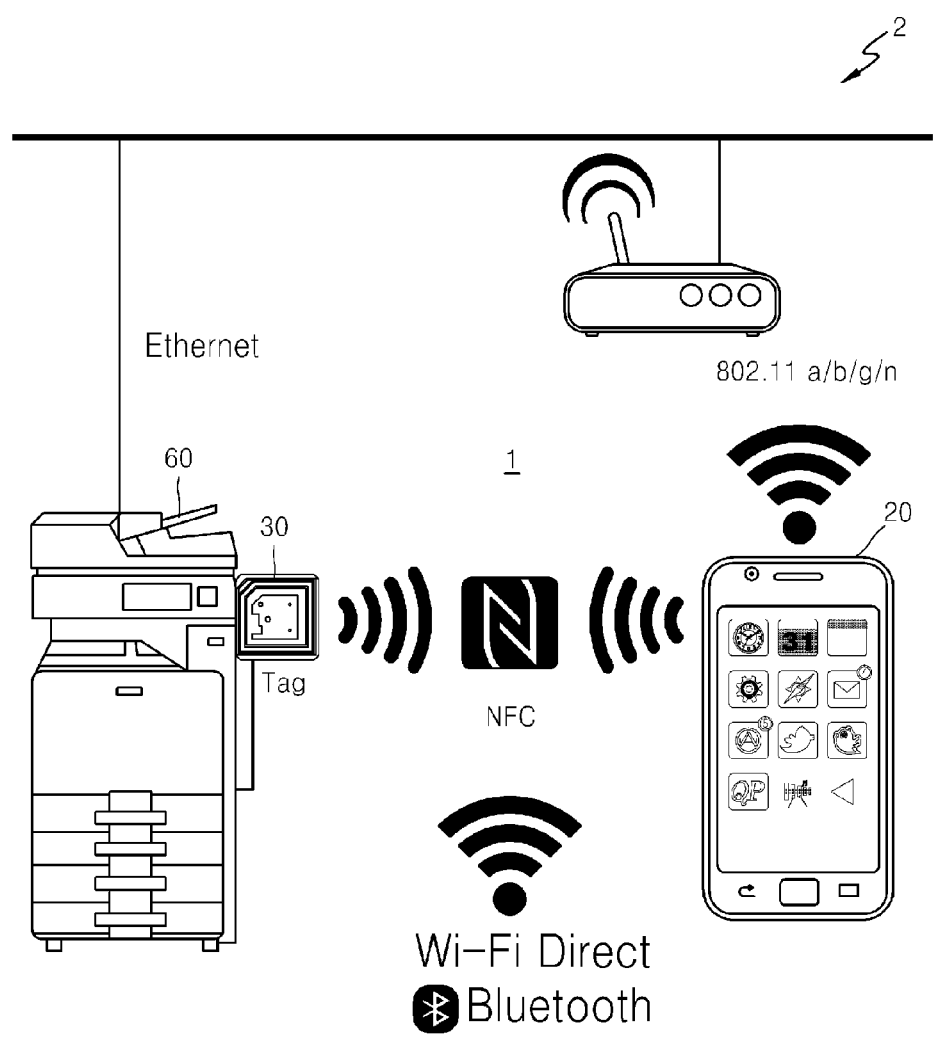
FIG. 1C illustrates a wireless communication environment in which an image forming apparatus and a user device are present, according to an exemplary embodiment of the present general inventive concept.

FIG. 1A illustrates a near field communication (NFC) environment 1 according to an exemplary embodiment of the present general inventive concept. Referring to FIG. 1A, an image forming apparatus 60 and a user device 20 (such as a smartphone) each supporting an NFC function are present in the NFC environment 1. An NFC chip is embedded in the image forming apparatus 60 illustrated in FIG. 1 in advance, and thus communication between the image forming apparatus 60 and the user device 20 may be performed via NFC.

FIG. 1B illustrates an NFC environment 1 which is similar to the NFC environment 1 FIG. 1A, according to an exemplary embodiment of the present general inventive concept. Referring to FIG. 1B, an image forming apparatus 60 and a user device 20 each supporting an NFC function are also present in the NFC environment 1. In particular, an NFC tag 30 is embedded in advance in the image forming apparatus 60 of FIG. 1A, whereas no NFC tag 30 is embedded in the image forming apparatus 60 in FIG. 1B in advance. Accordingly, the image forming apparatus 60 of FIG. 1B may communicate with the user device 20 via NFC only when an NFC tag 30 is installed later in the image forming apparatus 60 of FIG. 1B.

However, it will be understood by one of ordinary skill in the art that if an NFC tag 30 is installed later in the image forming apparatus 60 of FIG. 1B, then an operation of the NFC environment 1 of the current exemplary embodiment is identical to that of the NFC environment 1 of FIG. 1A, in which the NFC tag 30 is embedded in advance.

While just one pair of devices, that is, the image forming apparatus 60 and the user device 20, is present in the NFC environment 1 illustrated in FIGS. 1A and 1B for convenience of description, more electronic devices of different types that support an NFC function may also be present in the NFC environment 1. These devices may also operate in the same manner of NFC as in the current exemplary embodiment of the present general inventive concept, which would be understood by one of ordinary skill in the art.

Figure 10:
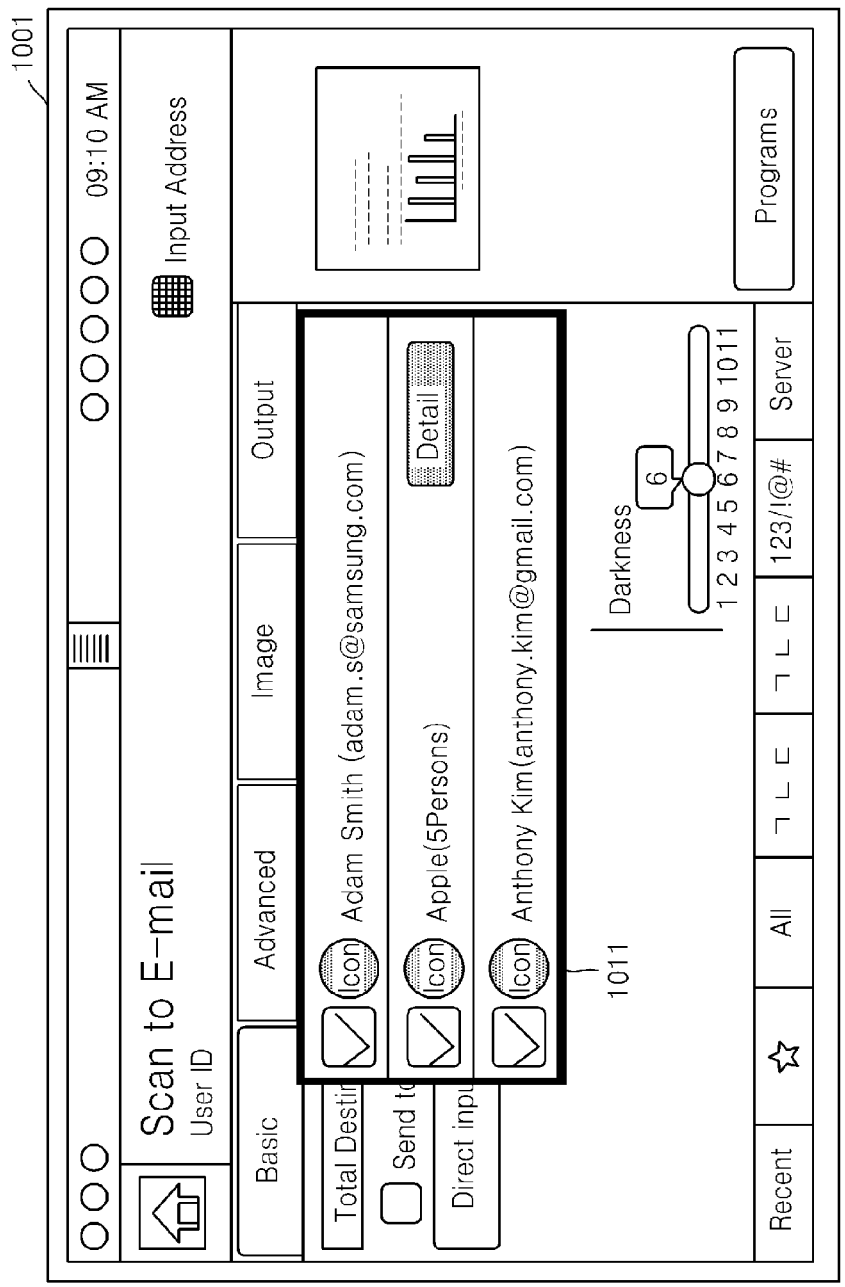
FIG. 10 illustrates a custom UI when a scan-to-email operation is executed in an image forming apparatus that is NFC-tagged by an NFC device, according to another exemplary embodiment of the present general inventive concept.

FIG. 10 illustrates an alternative wireless communication environment 2 according to another exemplary embodiment of the present general inventive concept, in which an image forming apparatus 60 and a user device 20 are present. Referring to FIG. 10, other peripheral wired/wireless networks are illustrated in addition to the NFC environment 1 of FIG. 1A or 1B. The NFC environment 1 may operate in combination with peripheral wired/wireless networks, such as Wi-Fi Direct, Bluetooth, Ethernet, 802.11a/b/g/n, etc.

Before describing the exemplary embodiments of the present general inventive concept in detail, NFC technology will be described.

NFC is a contactless short-range wireless communication standard between electronic devices within a short distance of 10 cm with low power consumption by using a frequency of 13.56 MHz. A data transfer rate of NFC is 424 Kbps, and NFC has excellent security due to high proximity and encryption technology. NFC forgoes a complicated pairing process of recognition of devices but allows devices to recognize one another within 1/10 second or less. In particular, NFC is a smart card type contactless wireless communication technology where radio frequency identification (RFID) technology is utilized. In addition, NFC builds upon RFID technology by allowing two-way communication whereas conventional smart cards only allow one-way communication. Furthermore, NFC has a relatively large memory storage space and offers more variety of services.

In detail, NFC is a wireless communication method in which data is directly exchanged between terminals, for example, between the image forming apparatus 60 and the user device 20, without using a communication network, and is a type of RFID method. A wireless communication method using RFID may be classified according to frequencies used. For example, RFID at 13.56 MHz is mainly used for smart cards, such as transit cards or entrance cards, and RFID at 900 MHz is used mainly for logistics. NFC corresponds to RFID which, like smartcards, uses a frequency of 13.56 MHz. However, unlike smartcards, which allow only one-way communication, NFC allows two-way communication. Accordingly, NFC is different from smart cards, which function merely as a tag that stores particular information and transmit the same to a reader. NFC allows a tag function according to necessity but also supports a function of recording information on the tag, and may be used in peer to peer (P2P) data exchange between terminals in which NFC is set.

Figure 2A:
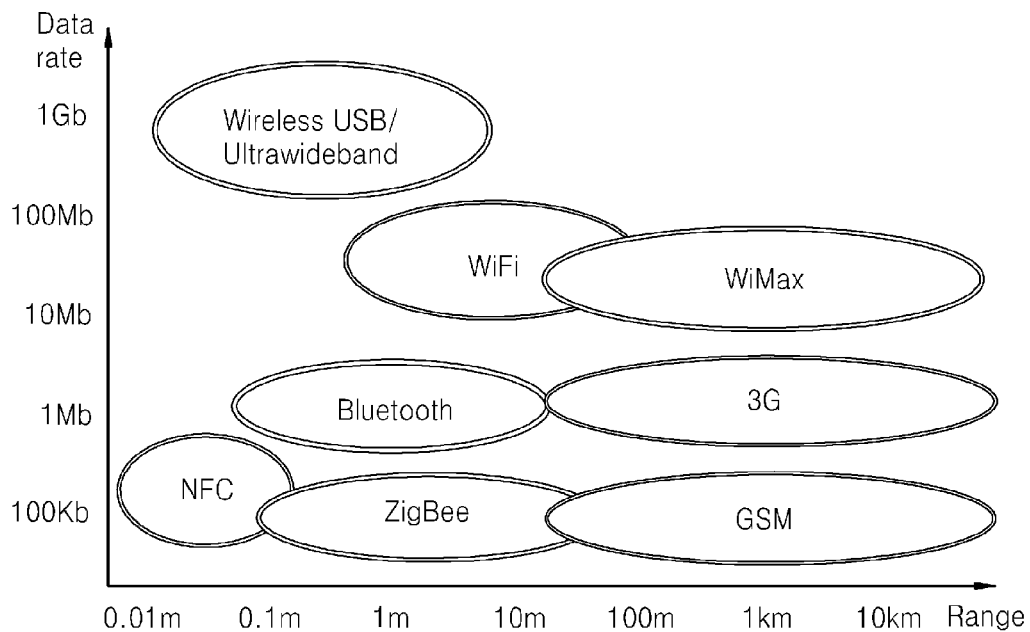
FIG. 2A is a graph comparing data rates and communication ranges of NFC and other wireless communication methods.

NFC which is developed based on RFID may be compared with other wireless communication methods, such as Wi-Fi Bluetooth, ZigBee, etc., as illustrated in FIG. 2A.

FIG. 2A is a graph comparing data rates and communication ranges of NFC and other wireless communication methods. Referring to FIG. 2A, compared to other wireless communication methods, NFC may operate at a distance within about 10 cm. Unlike Bluetooth or Wi-Fi etc., which allow communication in about several to several tens of meters, NFC allows communication only within an extremely short distance (about 10 cm).

In addition, NFC may be compared to other wireless communication methods, such as Bluetooth, ZigBee, etc., as described in Table 1 below.

TABLE 1

| Technology | Frequency used | Security | Standard range | Major service area |
|---|---|---|---|---|
| NFC | 13.56 MHz | Encryption is applied | International Standard | contactless payment, RFID, file transmission |
| Bluetooth | 2.4 GHz | N/A | International Standard | file transmission |
| ZigBee | 2.4 GHz | N/A | International Standard | device control, RFID |
| 900 MHz RFID | 900 MHz | N/A | Korean standard | RFID |

In other words, compared to other wireless communication methods, NFC operates only within a distance of 10 cm and applies encryption technology, and thus, a security level of NFC is high. Accordingly, when used in combination with other high-speed wireless communication methods, such as 3G or Wi-Fi, communication between devices via NFC may be performed with a higher efficiency. For example, when NFC and Bluetooth technology are combined, NFC may be used in connecting terminals (authorization) and Bluetooth may be used in data transmission between the terminals to thereby enable more efficient communication between the devices.

Figure 2B:
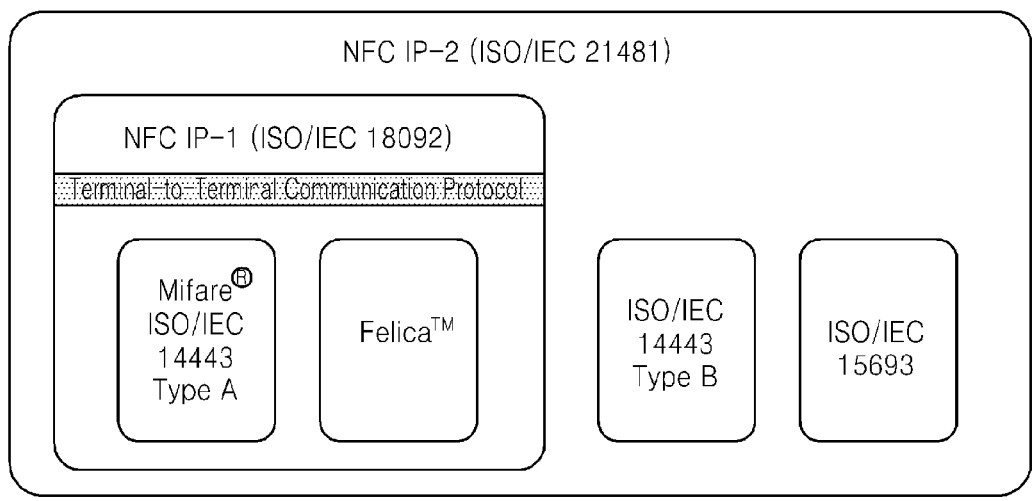
FIG. 2B is a view of standards related to NFC technology.

FIG. 2B is a view of standards related to NFC technology.

Referring to FIG. 2B, NFC standard technology follows International Organization for Standardization (ISO) and is also an extension of ISO 14443 Proximity-card Standard, and here, the inclusion relation of NFC IP-1 (NFC Interface Protocol-1) (ISO/IEC 18092) and NFC IP-2 (ISO/IEC 21481) is illustrated. Here, ISO/IEC 14443 Type A and Type B, FeliCa, and ISO/IEC 15693 are international standards of four areas of contactless cards operating at 13.56 MHz. Also, ISO/IEC 18092 defines communication modes for NFC interface and protocol.

Figure 3A:
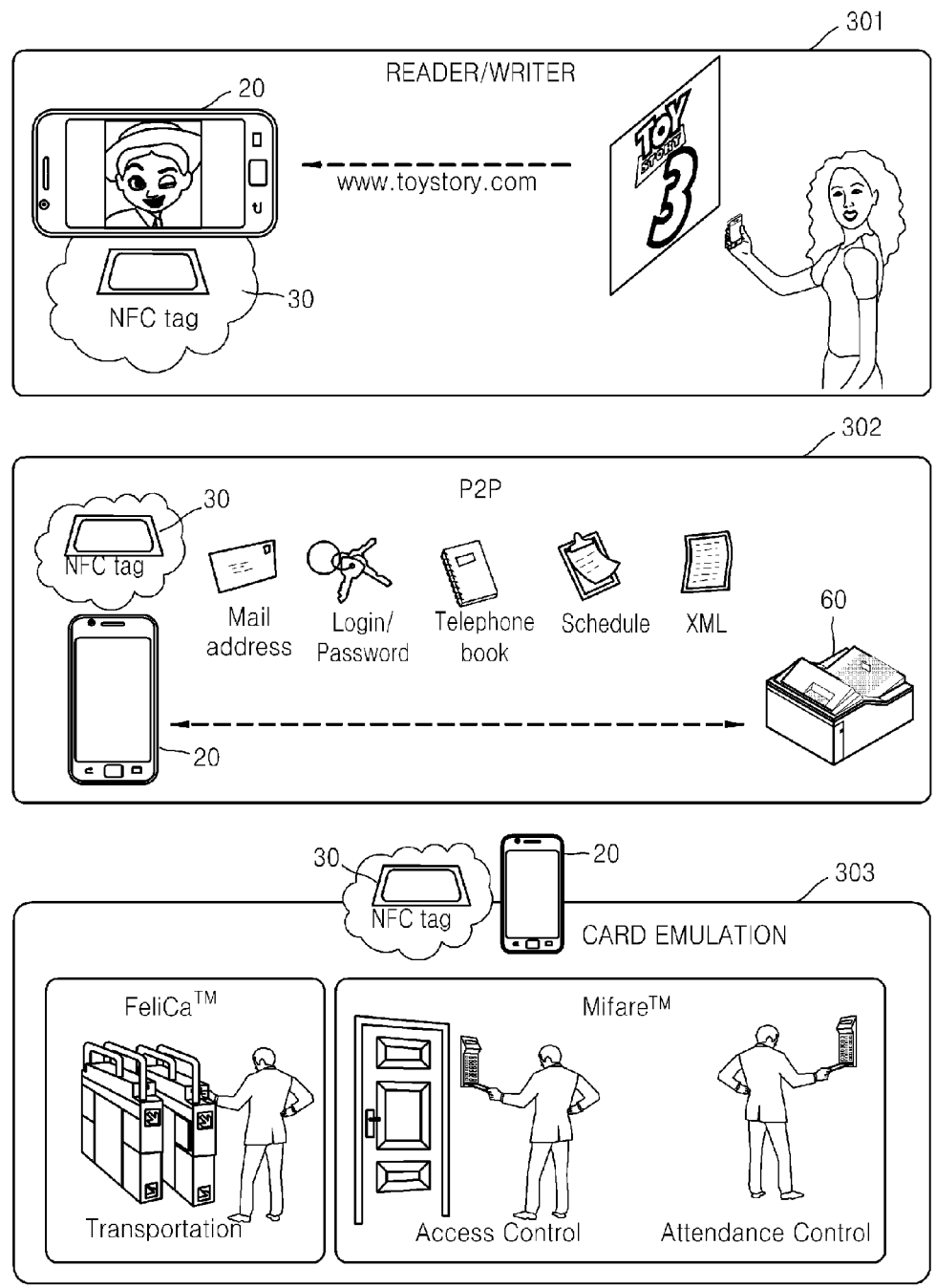
FIGS. 3A and 3B are diagrams to explain three communication modes of NFC.
Figure 3B:
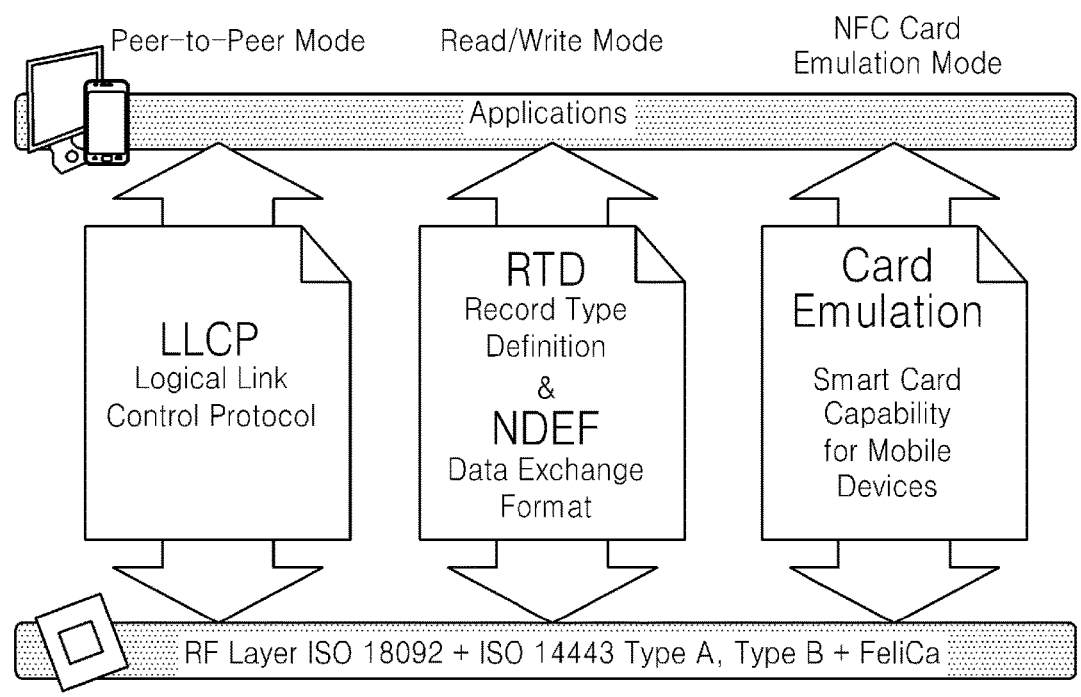

FIGS. 3A and 3B are diagrams to explain three communication modes of NFC.

Referring to FIG. 3A, the NFC Forum has standardized major NFC communication modes, which are a Reader/Writer mode 301, a P2P mode 302, and a Card Emulation mode 303. In sum, the three communication modes of NFC may be listed as in Table 2 below.

TABLE 2

| | ISO/IEC 15693 | ISO/IEC 18092 | ISO/IEC 14443 |
|---|---|---|---|
| Operational mode | communication between reader and tag (VCD, Reader/Writer mode) | communication between devices (P2P mode) | communication between reader and tag (PCD, Card Emulation mode) |
| Power supply | Manual | active and manual | manual |
| Range of communication | 1 m | 10-20 cm | 10 cm |
| Data rate | 26 Kbps or less | 106 Kbps, 212 Kbps, 424 Kbps | 106 Kbps |

(PCD: Proximity Coupling Device, VCD: Vicinity Coupling Device)

First, the Reader/Writer mode 301 supports that the user device 20, in which an NFC tag 30 is embedded, operates as a reader to read another NFC tag 30 or operates as a writer to input information to another NFC tag 30.

In the P2P mode 302, communication at a link level between two NFC terminals, for example, between the image forming apparatus 60 and the user device 20, is supported (ISO/IEC 18092). To establish a connection, a client (NFC P2P initiator, for example the user device 20) searches for a host (NFC P2P target, for example the image forming apparatus 60) and transmits data of an NFC Data Exchange Format (NDEF) message format. In the P2P mode 302, data, such as mail addresses, login/password information, schedules, telephone numbers, and XML data, may be exchanged just by touching the image forming apparatus 60 with the user device 20.

Finally, in the Card Emulation mode 303, the user device 20, in which an NFC tag 30 is embedded, operates as a smart card (ISO/IEC 14443). Accordingly, NFC is compatible not only with ISO 14443, which is the international standard for contactless cards, but also with FeliCa by Sony and MiFare by Philips.

In order to coordinately provide the three communication modes of NFC, a protocol is standardized as illustrated in FIG. 3B. Referring to FIG. 3B, a software structure in an NFC system is illustrated.

Logical Link Control Protocol (LLCP) is a protocol that sets a communication connection between layers and controls the same. An NDEF message is a basic message structure defined in an NFC communication protocol. The NDEF is a standard exchange format for Uniform Resource Identifier (URI), smart posters, and others, which defines a recording format regarding message exchange between NFC Forum-compatible devices and tags. An NDEF message includes at least one NDEF record. The NDEF record includes a payload that is described according to type, length, and option identifiers. An NDEF payload refers to application data included in an NDEF record. Record Type Definition (RTD) defines a record type and a type name which may correspond to an NDEF record. A Card Emulation allows smart card capability for mobile devices.

Figure 4:
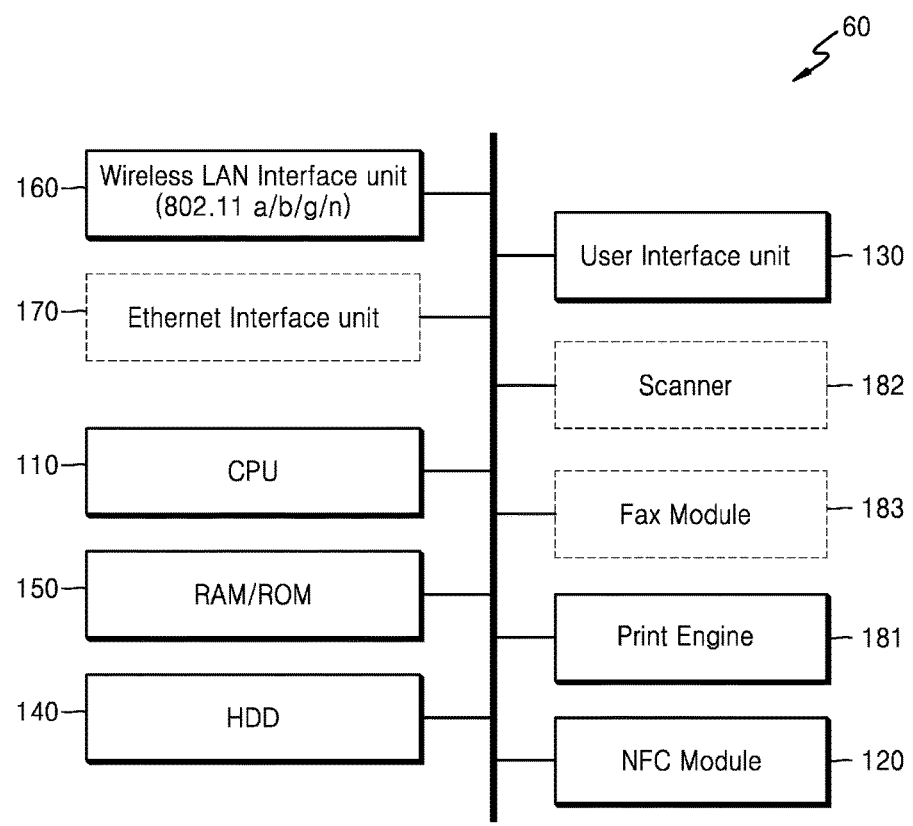
FIG. 4 is a block diagram illustrating a basic hardware structure of an image forming apparatus supporting an NFC function, according to an exemplary embodiment of the present general inventive concept.

FIG. 4 is a block diagram illustrating a basic hardware structure of the image forming apparatus 60 supporting an NFC function, according to an exemplary embodiment of the present general inventive concept. Referring to FIG. 4, the image forming apparatus 60 may include a central processing unit (CPU) 110, an NFC module 120, a user interface unit 130, a hard disk drive (HDD) 140, a random access memory/read only memory (RAM/ROM) 150, a wireless local area network (WLAN) interface unit 160, an Ethernet interface unit 170, a print engine 181, a scanner 182, and a fax module 183. If the image forming apparatus 60 supports only WLAN, the Ethernet interface unit 170 may not be included. Also, if the image forming apparatus 60 is a printer, the scanner 182 and the fax module 183 may not be included.

The CPU 110 controls the overall operation of the image forming apparatus 60, and information needed to control and print data is stored in the HDD 140 and the RAM/ROM 150 and read therefrom when necessary.

The user interface unit 130 is hardware used as a medium for the user when the user checks information of the image forming apparatus 60 and inputs a command to the image forming apparatus 60. The user interface unit 130 may be designed in various manners according to products. For example, it may be formed in a simple form of two or four lines on a display, such as a liquid crystal display (LCD) or light emitting diode (LED), or as a graphic user interface (GUI), so as to enable various graphical representations.

The WLAN interface unit 160 refers to hardware that performs IEEE 802.11 a/b/g/n functionality, and may communicate with a main board of the image forming apparatus 60 via a universal serial bus (USB) or the like. The WLAN interface unit 160 may also support Wi-Fi Direct at the same time.

The Ethernet interface unit 170 refers to hardware that performs wired Ethernet communication according to IEEE 802.3. Depending on the exemplary embodiment, the Ethernet interface unit 170 may not be included in the image forming apparatus 60.

The print engine 181, the scanner 182, and the fax module 183 refer to hardware to perform a printing function, a scan function, and a fax function, respectively. Depending on the exemplary embodiment, the scanner 182 and the fax module 183 may not be included in the image forming apparatus 60.

In particular, the image forming apparatus 60 includes the NFC module 120 to thereby communicate with other NFC devices, such as the user device 20, via NFC. The NFC module 120 is in charge of the NFC function and may data read from or write data to an NFC tag 30. Also, communication with the main board of the image forming apparatus 60 is performed by using a Universal Asynchronous Receiver/Transmitter (UART), an Inter Integrated Circuit (I2C), a Serial Peripheral Interface Bus (SPI), or the like (not illustrated). As described above with reference to FIGS. 1A and 1B, the NFC module 120 may be embedded in the image forming apparatus 60 in advance at the time of factory shipment, or may be available when the user installs the NFC tag 30 later.

Although not illustrated in FIG. 4, the image forming apparatus 60 may also include other wireless communication modules, such as for example a Bluetooth module or a ZigBee module.

Figure 5:
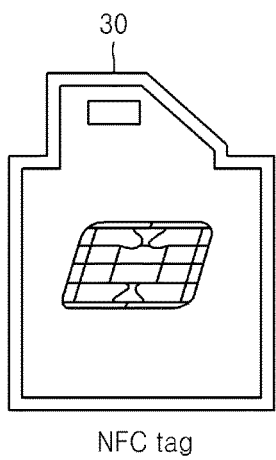
FIG. 5 illustrates an NFC tag and information stored in the NFC tag installed in the image forming apparatus of FIG. 1B.

FIG. 5 illustrates the NFC tag 30 installed in the image forming apparatus 60 of FIG. 1B and information 510 stored in the NFC tag 30. Referring to FIG. 5, in the case of the image forming apparatus 60 of FIG. 1B, the NFC function may be utilized when the NFC tag 30 is inserted into a slot (not illustrated) that is provided in advance in the image forming apparatus 60. The information 510 of the NFC tag 30, for example, performance information of the image forming apparatus 60, may be recorded by other NFC devices in the Reader/Writer mode 301 or may be stored in advance by a manager.

An image forming apparatus 60 supporting an NFC function according to an exemplary embodiment of the present general inventive concept and detailed functions and operations thereof in regards to a method of providing a user interface screen that is customized for the user device 20 in the image forming apparatus 60 will be described in detail below with reference to the drawings. Hereinafter, the user device 20 may be an NFC device in the exemplary embodiments of the present general inventive concept.

Figure 6A:
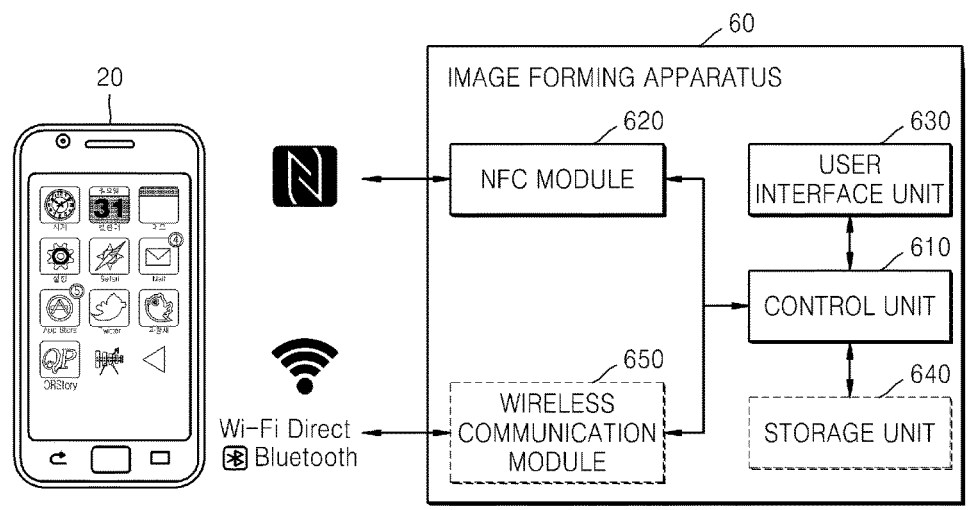
FIG. 6A is a block diagram illustrating a hardware structure of an image forming apparatus that provides a user interface (UI) customized for an NFC device by tagging the NFC device, according to an exemplary embodiment of the present general inventive concept.

FIG. 6A is a block diagram illustrating a hardware structure of an image forming apparatus 60 that provides a user interface (UI) customized for an NFC-compatible user device 20 by tagging the user device 20, according to an exemplary embodiment of the present general inventive concept.

In FIG. 6A, only hardware components related to the current exemplary embodiment of the present general inventive concept will be described in order not to obscure the characteristics of the current exemplary embodiment. However, it will be understood by one of ordinary skill in the art that general-use hardware components other than the illustrated hardware components in FIG. 6A may also be included.

Referring to FIG. 6A, the image forming apparatus 60 is illustrated as including just hardware components related to the current exemplary embodiment from among the hardware components of the image forming apparatus 60 illustrated in FIG. 4. However, it will be understood by one of ordinary skill in the art that elements that are omitted in FIG. 6A but described with reference to the image forming apparatus 60 of FIG. 4 may also be applied to the image forming apparatus 60.

The image forming apparatus 60 includes a control unit 610, an NFC module 620, a user interface unit 630, a storage unit 640, and a wireless communication module 650.

In FIG. 6A, the control unit 610 corresponds to the CPU 110 of FIG. 4, the NFC module 620 corresponds to the NFC module 120 of FIG. 4, the user interface unit 630 corresponds to the user interface unit 130 of FIG. 4, and the storage unit 640 corresponds to the HDD 140 of FIG. 4. Meanwhile, the wireless communication module 650 refers to any hardware that uses wireless communication methods other than NFC, such as a Bluetooth module or a ZigBee module. Depending on the exemplary embodiment, the wireless module 650 may not be included in the image forming apparatus 60.

The user interface unit 630 displays a basic user interface that provides menus related to an image job and imaging task options. The basic user interface may refer to a user interface that is displayed as default in the image forming apparatus 60 before the user device 20 is NFC-tagged.

According to the current exemplary embodiment of the present general inventive concept, examples of image jobs may be copying, printing, scanning or faxing supported by the image forming apparatus 60. Also, examples of image job options may include a paper size option such as A3 or A4, a paper sheet number option for printing or copying, a tray setting option, a multi-color or black-and-white printing option, a multi-color or black-and-white copying option, a scan-to-email option, a scan-to-server option. A large number of various options as described above, which are needed to perform image jobs in the image forming apparatus 60, may be included.

The NFC module 620 recognizes access of the user device 20 having an NFC function according to an NFC protocol. In order to activate the NFC function and establish a connection, a predetermined NFC device corresponding to a client (e.g., the user device 20) has to access another NFC device corresponding to a host (e.g., the image forming apparatus 60), within a proximity range of 10 cm.

Accordingly, the NFC module 620 NFC-tags the user device 20 by recognizing the access by the user device 20. Also, as the NFC module 620 receives an NDEF message defined according to the NFC standards from the user device 20 as described above, the NFC module 620 also receives identification information of the user device 20 included in the NDEF message.

Identification information included in the NDEF message includes information that is uniquely included only in the user device 20 such as an International Mobile Station Equipment Identity (IMEI), an Integrated Circuit Card Identifier (ICCID), a MAC address, an Internet Protocol (IP) address, a phone number, or a Personal Identification Number (PIN) of the user device 20.

The control unit 610 identifies the user device 20 based on the received identification information of the user device 20. The control unit 610 may identify the user device 20 by comparing a list of identification information stored in advance in the storage unit 640 included in the image forming apparatus 60 and the received identification information. Alternatively, the control unit 610 may receive the list of identification information stored in advance in an external server (not illustrated) via the wireless communication module 650 and may identify the user device 20 by comparing the received list of identification information and the received identification information.

Meanwhile, a user of the user device 20 may store a list of identification information in the storage unit 640 by preprocessing an operation of authentication or registration of the user device 20 in the image forming apparatus 60. Also, a user of the user device 20 may store a list of identification information in the storage unit 640 by preprocessing an operation of authentication or registration of the user device 20 in an external server (not illustrated) via a communication unit such as the Internet.

When the user device 20 is identified, the user interface unit 630 may convert the displayed basic user interface to a custom UI corresponding to the identified user device 20.

The custom UI according to the current exemplary embodiment of the present general inventive concept is a user interface that is distinguished from a basic UI, and refers to a UI where a screen configuration of the basic UI or image job options that are settable via the basic UI are customized for the user device 20.

When the user device 20 is identified, the user interface unit 630 displays a custom UI by modifying a screen configuration on the basic UI indicating menus related to an image job such as copying, printing, or scanning, to a screen configuration that is customized for the identified user device 20.

The custom UI has a screen configuration in which an arrangement, shape, language set up, or background screen displayed on the basic UI are customized for the user device 20.

Also, the custom UI may have a screen configuration in which menus that are not allowed for the user device 20 may be inactivated, from among menus displayed on the basic UI. That is, the image forming apparatus 60 may restrict a user of a predetermined user device 20 to use only some of the various image jobs, via the custom UI.

Furthermore, the custom UI may include menus that are customized based on types of applications installed in the user device 20.

For example, when a cloud application providing a cloud function is installed in the user device 20, the image forming apparatus 60 may receive information about the cloud application installed in the user device 20 via the NFC module 620 or the wireless communication module 650. Also, the image forming apparatus 60 may receive information about other applications installed in the user device 20.

When information about the cloud application installed in the user device 20 is received, the custom UI may include a menu to execute an operation of transmitting an image scanned by the image forming apparatus 60 to the cloud connected to the cloud application. That is, the custom UI may include a custom menu such as a Scan to Cloud (e.g., Scan to Dropbox, Scan to GoogleDrive, or the like) by using the information about the cloud application installed in the user device 20.

As described above, a screen of the custom UI according to an exemplary embodiment of the present general inventive concept displayed to have a different screen configuration from that of the basic UI will be described below in detail where relevant with reference to the drawings.

Meanwhile, when the user device 20 is identified, the user interface unit 630 may display an image job customized for the identified user device 20, on the custom UI.

The customized image job options may include options that limit a usage range of image jobs available in the user device 20.

As described above, in order to perform an image job such as copying, printing, scanning, or faxing in the image forming apparatus 60, various types of options such as a paper option such as A3 or A4, a paper sheet number option for printing or copying, a multi-color or black-and-white printing option, a multi-color or black-and-white copying option, a scan-to-email option, a scan-to-server option, or the like, may be selected.

For example, when the user device 20 is identified, a custom UI may provide an image job option that restricts usage of a predetermined function such as an image job option with a limited paper sheet number for copying or printing, an image job option with a limited type of paper for copying or printing, an image job option where faxing by international phone call is restricted, an image job option where an available tray is limited, and an image job option where use of a multiple color or a black-and-white color is restricted.

That is, image job options provided on the custom UI may be set such that a usage range of the options are restricted with respect to a predetermined user device 20.

However, customized image job options may include options where a target, to which a result (e.g., a scanned image) of an image job (e.g., scanning) is to be transmitted, is set as address book information stored in the user device 20.

The image forming apparatus 60 may also receive address book information stored in the user device 20, in addition to the information about applications stored in the user device 20, via the NFC module 620 or the wireless communication module 650. The address book information stored in the user device 20 may include phone numbers, fax numbers, e-mail addresses, or server addresses of other people or companies.

That is, the custom UI may provide preset image job options by using the address book information stored in the user device 20.

Figure 6B:
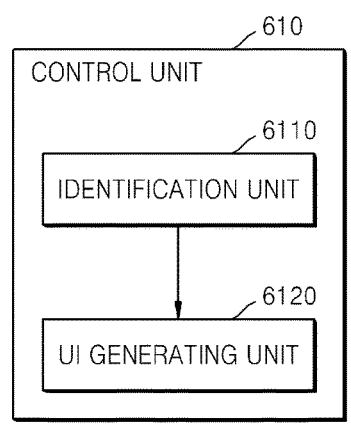
FIG. 6B is a detailed block diagram illustrating a hardware structure of a control unit of an image forming apparatus, according to an exemplary embodiment of the present general inventive concept.

FIG. 6B is a detailed block diagram illustrating a hardware structure of the control unit 610 of the image forming apparatus 60, according to an exemplary embodiment of the present general inventive concept.

In FIG. 6B, only hardware components related to the current exemplary embodiment of the present general inventive concept will be described in order not to obscure the characteristics of the current exemplary embodiment. However, it will be understood by one of ordinary skill in the art that general-use hardware components other than the illustrated hardware components of FIG. 6B may also be included.

The control unit 610 includes an identification unit 6110 and an UI generating unit 6120.

The identification unit 6110 identifies the user device 20 based on identification information of the user device 20 received via the NFC module 620.

As described above, a list of identification information obtained by mapping various types of NFC devices and identification information of these devices are stored in the storage unit 640 in advance. Also, the list of identification information may also be stored in advance in an external server (not illustrated) besides in the storage unit 640.

The identification unit 6110 identifies the user device 20 by determining whether identification information of the received user device 20 exists in the list of identification information that is stored in advance in the storage unit 640 or an external server.

As a result of identification by the identification unit 6110, when identification information of the user device 20 exists in the list of identification information, information indicating that the user device 20 is identified is transmitted to the UI generating unit 6110 in order to provide a custom UI corresponding to the user device 20.

When the user device 20 is identified, the UI generating unit 6120 generates a custom UI corresponding to the user device 20. The UI generating unit 6120 sets an arrangement, shapes, language set up, or background screen of menus to be included in the custom UI, and sets image job options to be included in each menu, thereby generating a custom UI.

The storage unit 640 may map preset custom UIs according to types of various NFC devices and store the same in advance. In this case, the UI generating unit 6120 may load the custom UI mapped to the particular NFC-capable user device 20 from the storage unit 640, thereby generating a custom UI that is customized for the user device 20.

Meanwhile, in addition to the information about a custom UI loaded from the storage unit 640, the UI generating unit 6120 may generate a custom UI by using application information or address book information installed in the user device 20 received from the user device 20 via the NFC module 620 or the wireless communication module 650.

As described above, the image forming apparatus 60 may display a custom UI that is customized for the user device 20 or personalized for a user of the user device 20 just by NFC-tagging the user device 20, and thus, a convenient UI screen for the user of the user device 20 may be provided. Also, a manager of the image forming apparatus 60 may easily set up restrictions to the image job options for the user of the user device 20 by using a custom UI displayed on the image forming apparatus 60. Furthermore, the user of the user device 20 may conveniently and simply set up image job options just by NFC tagging without setting image job options one by one.

The structure and operation of the image forming apparatus 60 has been described above. Hereinafter, the custom UIs according to exemplary embodiments of the present general inventive concept will be described in detail with reference to the drawings.

Figure 7:
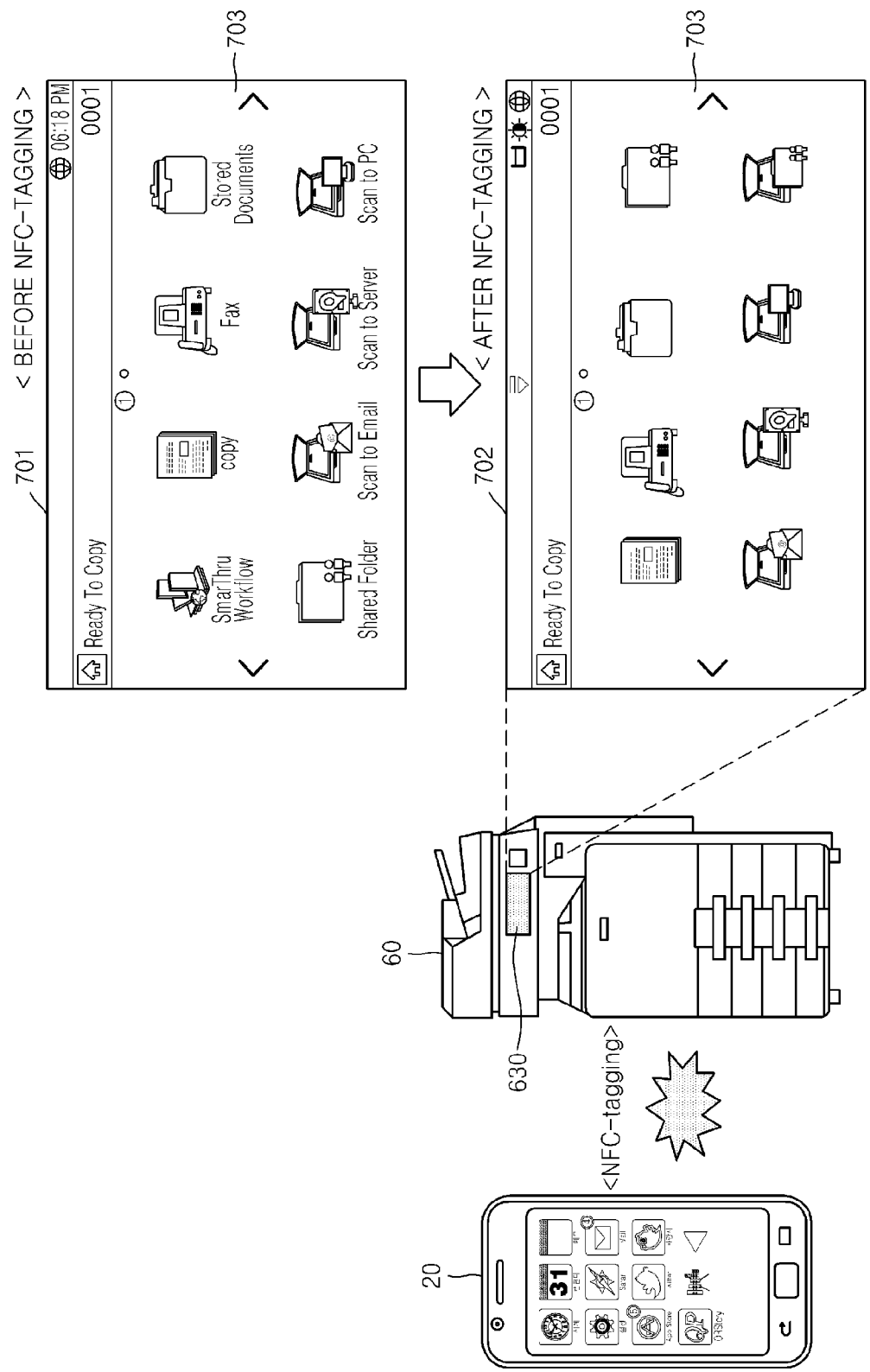
FIG. 7 illustrates a custom UI having a screen configuration corresponding to an NFC device, according to an exemplary embodiment of the present general inventive concept.

FIG. 7 illustrates a custom UI 720 having a screen configuration corresponding to an NFC-capable user device 20, according to an exemplary embodiment of the present general inventive concept.

Referring to FIG. 7, before the user device 20 is tagged on the image forming apparatus 60, a basic UI 701 is displayed on the user interface unit 630 of the image forming apparatus 60. The basic UI 701 may include one or more menus 703 related to an image job or image job options, to access the functions of the image forming apparatus 60. It will be understood that depending on the embodiment of the present general inventive concept, menus 703 may be icons, buttons, or other UI objects enabling a user to access the functions of the image forming apparatus 60.

When the user device 20 is tagged on the image forming apparatus 60, a display screen on the user interface unit 630 of the image forming apparatus 60 is converted such that the custom UI 702 is displayed.

The custom UI 702 illustrated in FIG. 7 has a different screen configuration from that of the basic UI 701. In detail, the custom UI 702 has a different language set up from a language set up of the basic UI 701. For example, the language set up of the basic UI 701 may be English, but a user of the user device 20 may only understand Japanese. In this case, the user interface unit 630 may display a custom UI 702 having a Japanese language set up by NFC-tagging by the user device 20.

As another example, the custom UI 702 may have a screen configuration that is differently arranged from menus (icons) 703 of the basic UI 701. That is, the custom UI 702 in which menus 703 of image jobs that are preferentially used by a user are arranged in an upper portion and the rest of menus 703 are disposed in a lower portion may be displayed.

Furthermore, the custom UI 702 may display a screen configuration having menus (icons) 703 of different shapes from those of the menus (icons) 703 of the basic UI 701 or a screen configuration having a background screen that is different from that of the basic UI 701. That is, the basic UI 701 and the custom UI 702 illustrated in FIG. 7 are exemplary, and it will be obvious to one of ordinary skill in the art that the custom UI 702 may be provided with other various screen configurations according to the particular exemplary embodiment of the present general inventive concept.

Figure 8:
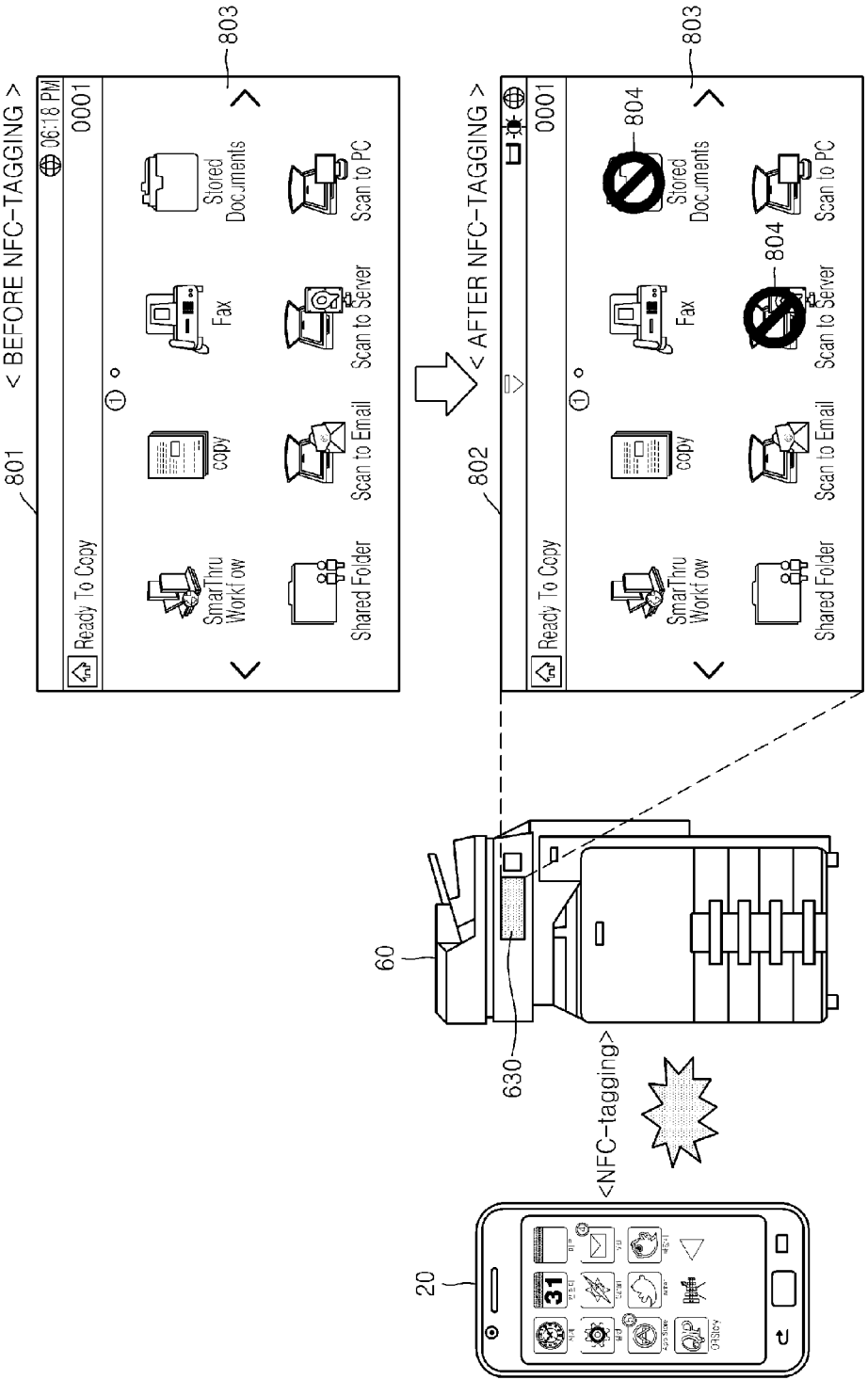
FIG. 8 illustrates a custom UI having a screen configuration corresponding to an NFC device, according to another exemplary embodiment of the present general inventive concept.

FIG. 8 illustrates an alternative custom UI 802 having a screen configuration corresponding to a user device 20, according to an exemplary embodiment of the present general inventive concept.

Referring to FIG. 8, before an image forming apparatus 60 is tagged by the user device 20, a basic UI 801 is displayed on a user interface unit 630 of the image forming apparatus 60. This basic UI 801 may be identical to or different from the basic UI 701 illustrated in FIG. 7, depending on the particular embodiment of the present general inventive concept. Similarly to the basic UI 701, the basic UI 801 also includes one or more menus 803 related to an image job or image job options, to access the functions of the image forming apparatus 60.

When the image forming apparatus 60 is tagged by the user device 20, a display screen is converted on the user interface unit 630 of the image forming apparatus 60 such that the custom UI 802 is displayed.

The custom UI 802 illustrated in FIG. 8 has a different screen configuration from that of the basic UI 801. In detail, the custom UI 802 displays one or more deactivated menus 804, from among the menus 803 that are activated in the basic UI 801.

A user of the user device 20 may not be able to use the deactivated menus 804 in the custom UI 802. These menus 804 may be those which are restricted by a manager of the image forming apparatus 60 or which are not supported in the user device 20. That is, the image forming apparatus 60 may not provide image jobs of the menus 803 to the user device 20 that is NFC-tagged, due to various reasons, and the user of the user device 20 may identify deactivated menus 804 corresponding to restricted functions, via the custom UI 802.

Figure 9:
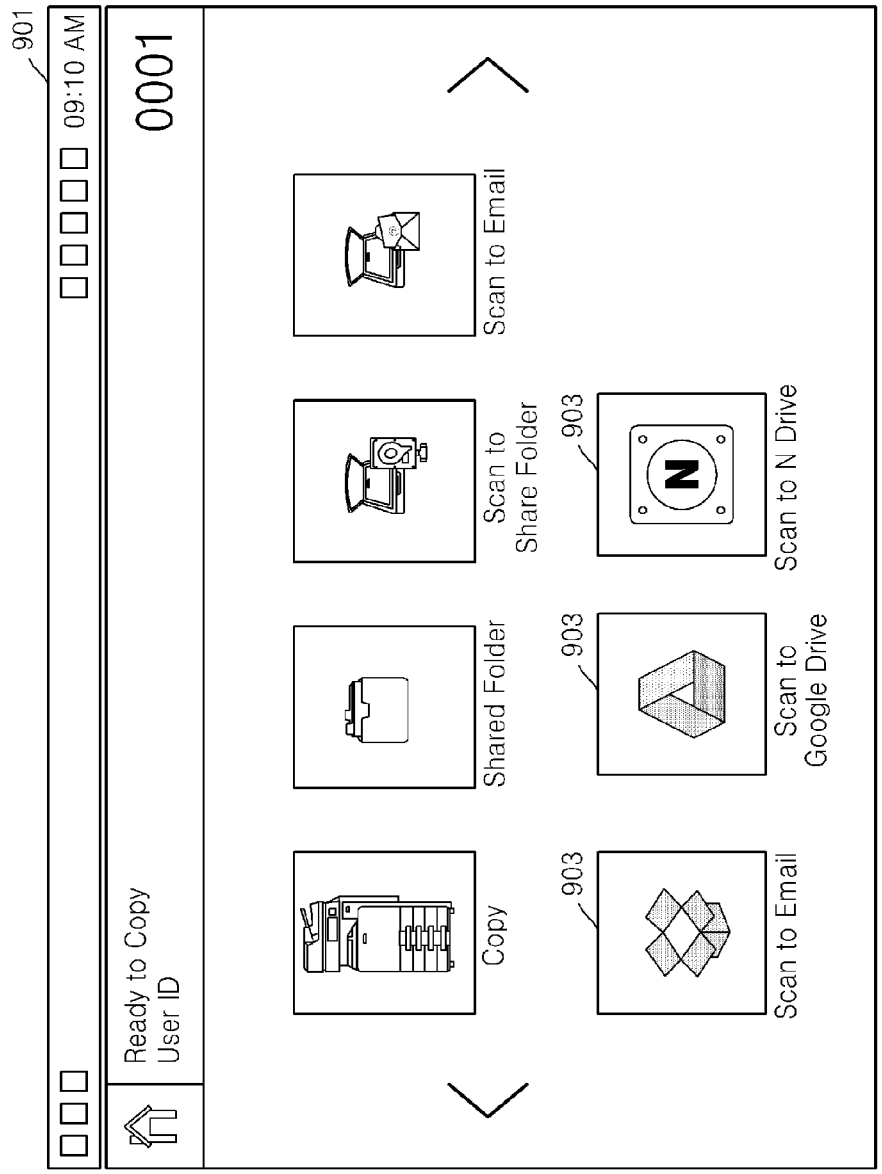
FIG. 9 illustrates a custom UI having a screen configuration customized by using application information installed in an NFC device, according to another exemplary embodiment of the present general inventive concept.

FIG. 9 illustrates a custom UI 901 having a screen configuration customized by using application information installed in the user device 20, according to another exemplary embodiment of the present general inventive concept.

Referring to FIG. 9, when the user device 20 is tagged on the image forming apparatus 60, in the user interface unit 630 of the image forming apparatus 60, a custom UI 901 having menus 903 corresponding to applications installed in the user device 20 is displayed. The menus 903 may correspond to cloud applications, such as for example GoogleDrive, and may also correspond to an e-mail function of the user device 20.

As described above, the image forming apparatus 60 may receive information about cloud applications installed in the user device 20 (e.g., Dropbox, GoogleDrive, or N-Drive) via the NFC module 620 or the wireless communication module 650.

The control unit 610, particularly, the UI generating unit 6120, generates the custom UI 901 such that the menus 903 to perform an operation of transmitting a scanned image to a cloud connected to the cloud applications, are included in the cloud UI 901, based on the information about the cloud applications, received from the user device 20.

The user interface unit 630 displays the custom UI 901 that is generated by the UI generating unit 6120 and provides the menus 903.

Thus, a user of the user device 20 may easily upload a scanned image to a desired cloud (e.g., Dropbox, GoogleDrive, or N-Drive) by using the menus 903 of the custom UI 901 without a complicated operation of receiving a scanned image from the user device 20 and uploading the scanned image by executing a cloud application in the user device 20.

While just the cloud applications have been described with reference to FIG. 9, it will be obvious to one of ordinary skill in the art that menus 903 that are customized for other types of applications such as a message application installed in the user device 20 may also be generated and displayed.

FIG. 10 illustrates a custom UI 1001 when a Scan-to-Email operation is executed in an image forming apparatus 60 that is NFC-tagged by a user device 20, according to another exemplary embodiment of the present general inventive concept.

As described above, the image forming apparatus 60 may receive address book information (e.g., phone number, e-mail address, fax number or server address) stored in the user device 20 via the NFC module 620 or the wireless communication module 650.

The control unit 610, particularly, the UI generating unit 6120, generates the custom UI 1001 such that options regarding a target for transmission of a scanned image is set as an address book stored in the user device 20, based on the address book information, received from the user device 20.

The user interface unit 630 displays the custom UI 1001 that is generated by the UI generating unit 6120 and provides the address book of the user device 20.

Referring to FIG. 10, when a Scan-to-Email operation is executed, the user interface unit 630 displays the custom UI 1001 in which e-mail addresses 1011 received from the user device 20 are listed, as a list of targets of the Scan-to-E-mail operation. Accordingly, a user of the user device 20 may select a desired email address from the e-mail addresses 1011 stored in the user device 20 and perform the Scan-to-E-mail operation without any input.

Figure 11:
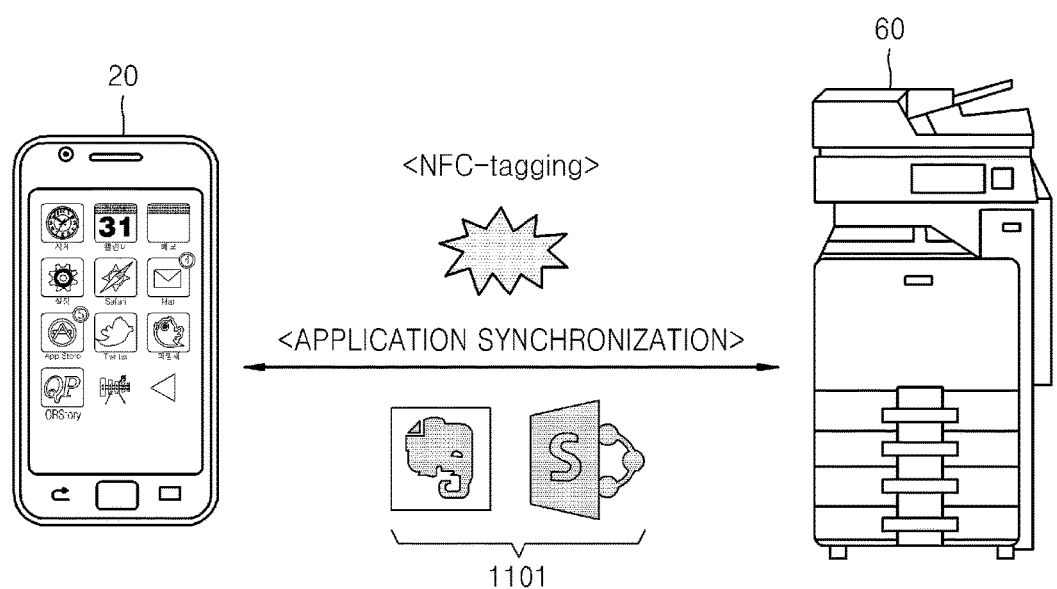
FIG. 11 is a schematic view illustrating synchronization between an NFC device and an image forming apparatus, according to an exemplary embodiment of the present general inventive concept.

FIG. 11 is a schematic view illustrating synchronization between an NFC-capable user device 20 and an image forming apparatus 60, according to an exemplary embodiment of the present general inventive concept.

As described above, the image forming apparatus 60 may receive information about applications installed in the user device 20 via the NFC module 620 or the wireless communication module 650.

When the user device 20 is identified, the control unit 610 determines whether there is an application 1101 that is commonly installed in the image forming apparatus 60 and the user device 20. When it is determined that the application 1101 that is commonly installed is present, the control unit 610 controls the application 1101 to be synchronized with the user device 20 by using the NFC module 620 or the wireless communication module 650.

The user interface unit 630 may provide a menu to synchronize the application 1101 on a custom UI. For example, a custom UI may provide a logging-in menu to log in the application 1101 as a user of the user device 20.

Alternatively, the control unit 610 may control the application 1101 to be synchronized by being automatically logged in using logging information of the application 1101 received via the NFC module 620 or the wireless communication module 650.

Alternatively, as a result of determination by the control unit 610, a commonly installed application 1101 may be determined to not be present. In this case, the control unit 610 may generate a menu in the custom UI to synchronize the application 1101 which is installed only in the user device 20 with the image forming apparatus 60 and installing the same in the image forming apparatus 60. That is, the user interface unit 630 may provide a menu to install and synchronize the application 1101.

Figure 12:
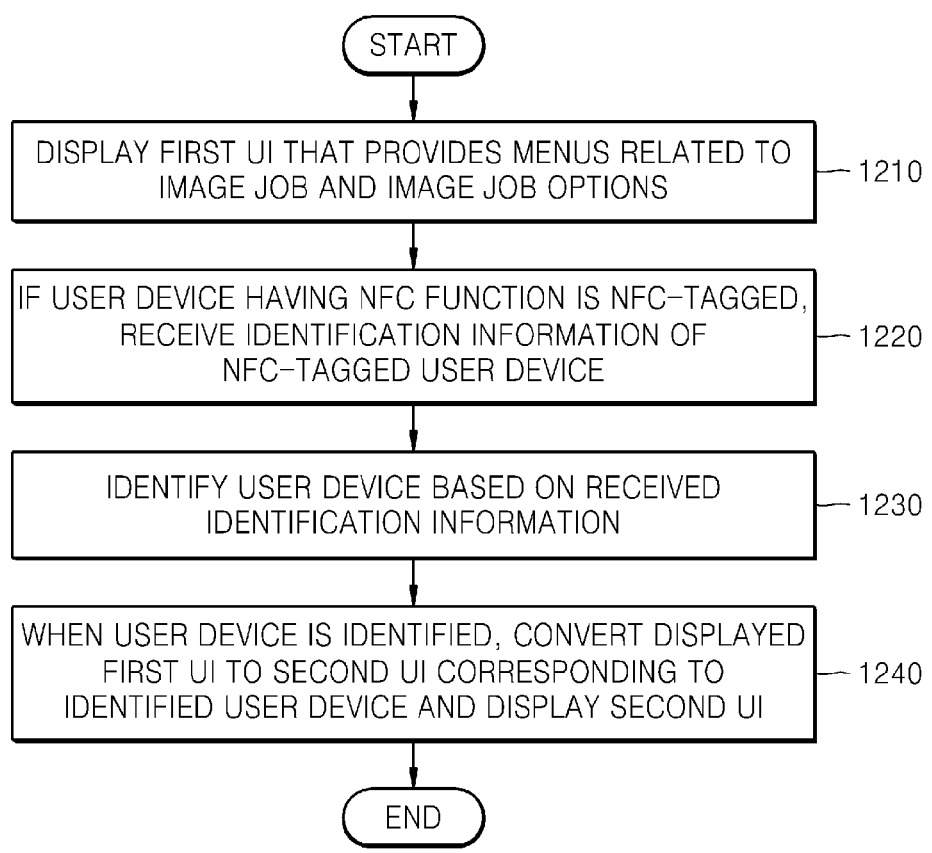
FIG. 12 is a flowchart illustrating a method of providing a UI screen that is customized for an NFC device in an image forming apparatus, according to an exemplary embodiment of the present general inventive concept.

FIG. 12 is a flowchart illustrating a method of providing a UI screen that is customized for a user device 20 in an image forming apparatus 60 according to an exemplary embodiment of the present general inventive concept. Referring to FIG. 12, the method of providing a UI screen customized for the user device 20 corresponds to processes that are time-sequentially performed in the image forming apparatus 60 of FIGS. 6A and 6B, and thus, details that are omitted below but have been described with reference to FIGS. 6A and 6B may also be applied to the image forming apparatus 60.

In operation 1210, the user interface unit 630 displays a first UI (basic UI) providing menus related to image jobs and image job options.

In operation 1220, if the user device 20 having an NFC function is NFC-tagged, the NFC module 620 receives identification information of the user device 20 that is NFC-tagged.

In operation 1230, the control unit 610 identifies the user device 20 based on the received identification information.

In operation 1240, when the user device 20 is identified, the user interface unit 630 converts the first UI (basic UI) to a second UI (custom UI) corresponding to the identified user device 20 and displays the second UI.

Figure 13:
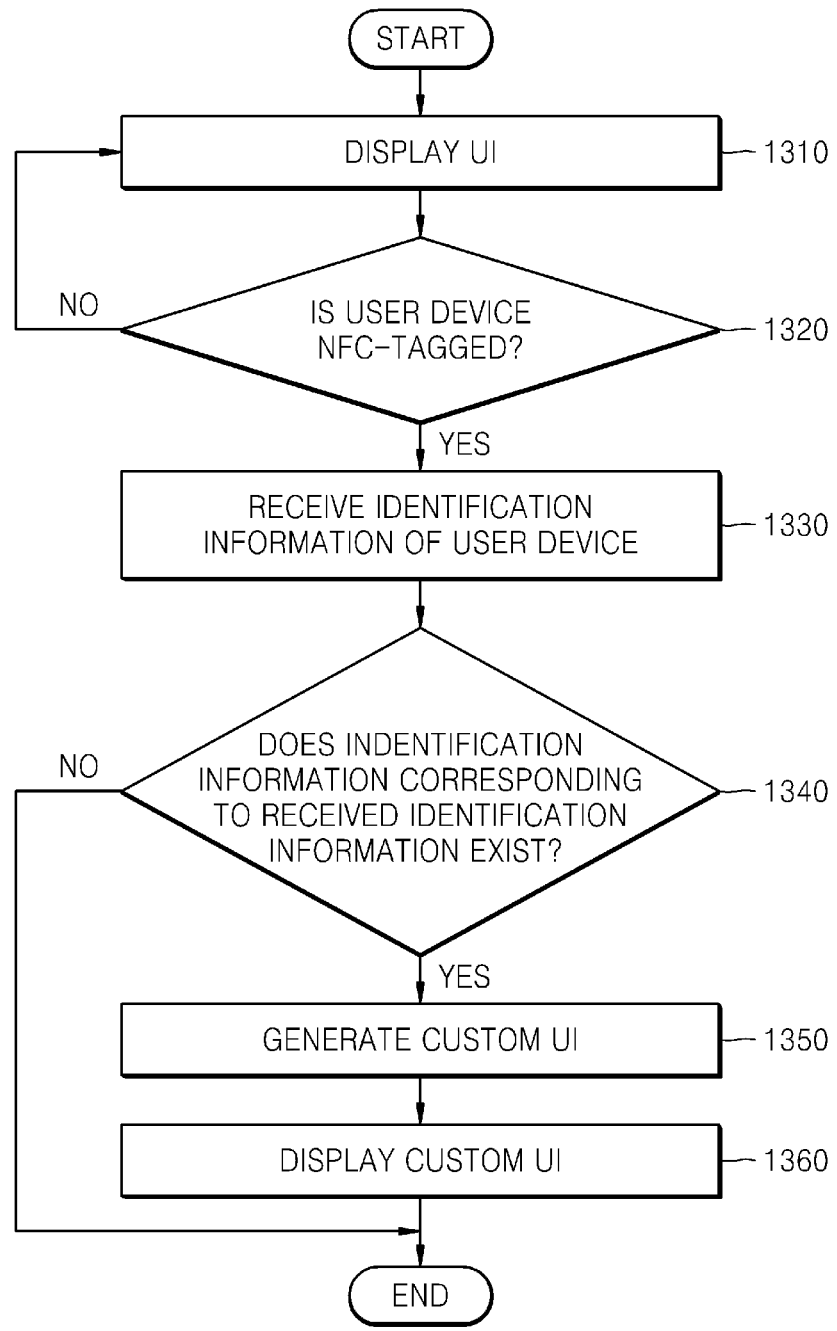
FIG. 13 is a detailed flowchart illustrating a method of providing a UI screen customized for the NFC device of the image forming apparatus of FIG. 12.

FIG. 13 is a detailed flowchart illustrating a method of providing a UI screen customized for the user device 20 in the image forming apparatus 60 of FIG. 12.

In operation 1310, the user interface unit 630 displays a basic UI that provides menus related to an image job and image job options.

In operation 1320, the control unit 610 determines whether the user device 20 is NFC-tagged.

If the user device 20 is NFC-tagged operation 1320-Y), in operation 1330 the NFC module 620 receives identification information of the user device 20 that is NFC-tagged.

In operation 1340, the control unit 610 (the identification unit 6110) identifies the user device 20 based on the received identification information. The control unit 610 may identify the user device 20 by comparing a list of identification information stored in advance in the storage unit 640 or an external server (not illustrated) and the received identification information. If no identification information corresponding to the received identification information exists (operation 1340-N), the process ends and the basic UI remains displayed.

If identification information corresponding to the received identification information does exist (operation 1340-Y), in operation 1350 the control unit (the UI generating unit 6120) generates a custom UI.

In operation 1360, the user interface unit 630 converts the displayed basic UI to the generated custom UI and displays the same.

While an exemplary embodiment of providing a custom UI via the user interface unit 630 of the image forming apparatus 60 on the side of the image forming apparatus 60 has been described above, an exemplary embodiment of providing a custom UI via a user interface unit of the user device 20 on the side of the user device 20 will be described below.

Figure 14:
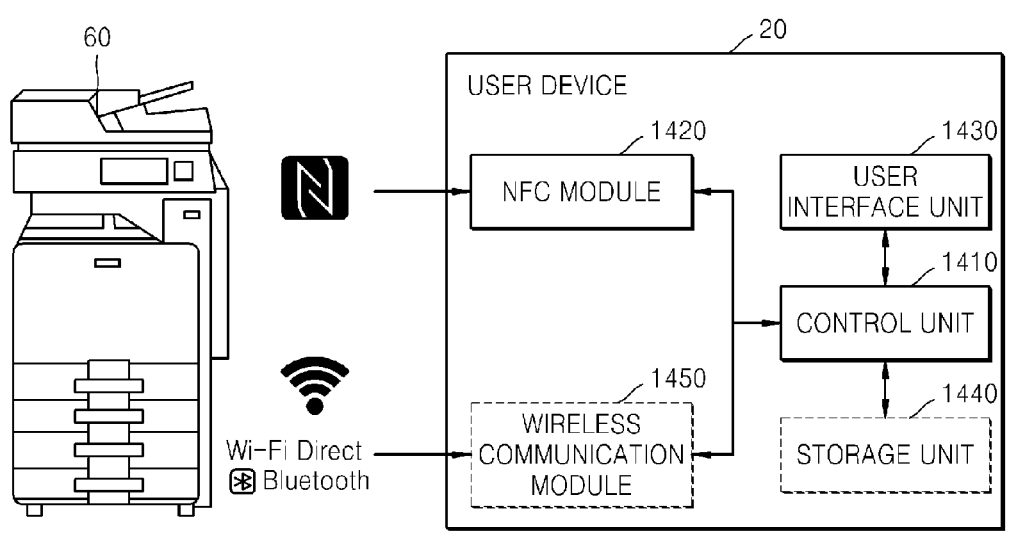
FIG. 14 is a block diagram illustrating a hardware structure of an NFC device providing a UI screen customized for an image forming apparatus by tagging the image forming apparatus, according to an exemplary embodiment of the present general inventive concept.

FIG. 14 is a block diagram illustrating a hardware structure of a user device 20 providing a UI screen customized for an image forming apparatus 60 by tagging the image forming apparatus 60, according to an exemplary embodiment of the present general inventive concept.

In FIG. 14, only hardware components related to the current exemplary embodiment of the present general inventive concept will be described in order not to obscure the characteristics of the current exemplary embodiment. However, it will be understood by one of ordinary skill in the art that general-use hardware components other than the illustrated hardware components of FIG. 14 may also be included.

The user device 20 includes a control unit 1410, an NFC module 1420, a user interface unit 1430, a storage unit 1440, and a wireless communication module 1450.

The wireless communication module 1450 refers to any hardware that uses a wireless communication method other than NFC, such as a third generation (3G) mobile communication module, a fourth generation (4G) mobile communication module, a Bluetooth module, or a ZigBee module. Depending on the particular embodiment of the present general inventive concept, the wireless communication module may be omitted from the user device 20.

In the user device 20, a printing application via which image jobs such as printing or copying may be performed by using the image forming apparatus 60 is installed in advance. That is, the user device 20 may control image jobs supported by the image forming apparatus 60 via the printing application.

The user interface unit 1430 displays a basic UI of the printing application executed in order to perform an image job. The basic UI may refer to a UI interface displayed as default in the user device 20 before the image forming apparatus 60 is NFC-tagged.

The NFC module 1420 recognizes access of the user device 20 having an NFC function according to an NFC protocol. In order to activate the NFC function and establish a connection, a predetermined user device 20 corresponding to a client (e.g., the image forming apparatus) has to access another NFC device corresponding to a host (e.g., the user device 20), within a proximity range of 10 cm.

Accordingly, the NFC module 1420 NFC-tags the user device 20 by recognizing the access by the user device 20. Also, as the NFC module 1420 receives an NDEF message defined according to the NFC standards from the image forming apparatus 60 as described above, the NFC module 1420 also receives identification information of the image forming apparatus 60 included in the NDEF message.

Identification information included in the NDEF message includes information that is uniquely included only in the image forming apparatus 60 such as an International Mobile Station Equipment Identity (IMEI), an Integrated Circuit Card Identifier (ICCID), a MAC address, an Internet Protocol (IP) address, phone number, or a Personal Identification Number (PIN) of the image forming apparatus 60.

The control unit 1410 identifies the image forming apparatus 60 based on the received identification information of the image forming apparatus 60. The control unit 1410 may identify the image forming apparatus 60 by comparing a list of identification information stored in advance in the storage unit 1440 included in the user device 20 and the received identification information. Alternatively, the control unit 1410 may receive the list of identification information stored in advance in an external server (not illustrated) via the wireless communication module 1450 and may identify the image forming apparatus 60 by comparing the received list of identification information and the received identification information. Since information may be stored outside of the user device 20, depending on the particular embodiment of the present general inventive concept the storage unit 1440 may be omitted from the user device 20.

When the image forming apparatus 60 is identified, the user interface unit 1430 may convert the displayed basic user interface to a custom UI corresponding to the identified image forming apparatus 60.

The custom UI according to the current exemplary embodiment of the present general inventive concept is a user interface that is distinguished from a basic UI, referring to a UI where a screen configuration of the basic UI or image job options that are settable via the basic UI are customized for the user device 20.

When the image forming apparatus 60 is identified, the user interface unit 1430 displays a custom UI by modifying a screen configuration on the basic UI indicating menus related to an image job such as copying, printing, or scanning, to a screen configuration that is customized for the identified image forming apparatus 60.

The custom UI has a screen configuration in which arrangement, shape, language set up, or background screen displayed on the basic UI are modified to be customized for the image forming apparatus 60.

Also, the custom UI may have a screen configuration in which menus that are not allowed for the user device 20 are displayed as being inactivated, from among menus displayed on the basic UI. That is, the image forming apparatus

60 may restrict a user of a predetermined user device 20 to use only some of various image jobs via the custom UI.

Meanwhile, when the image forming apparatus 60 is identified, the user interface unit 1430 may display image job options customized for the identified image forming apparatus 60 or the identified user device 20, on the custom UI of the printing application.

The customized image job options may include options that limit a usage range of image jobs available in the image forming apparatus 60.

As described above, in order to perform an image job such as copying, printing, scanning, or faxing in the image forming apparatus 60, various types of options such as a paper option such as A3 or A4, a paper sheet number option for printing or copying, a multi-color or black-and-white printing option, a multi-color or black-and-white copying option, a scan-to-e-mail option, a scan-to-server option, or the like may be provided.

For example, when the image forming apparatus 60 is identified, a custom UI may provide an image job option that restricts usage of a predetermined function such as an image job option with a limited paper sheet number for copying or printing, an image job option with a limited type of paper for copying or printing, an image job option where faxing by international phone call is restricted, an image job option where an available tray is restricted, and an image job option where use of a multi-color or a black-and-white color is restricted.

That is, image job options provided on the custom UI may be set such that a usage range of the options are restricted with respect to a predetermined image forming apparatus 60.

However, customized image job options may include options where a target, to which a result (e.g., a scanned image) of an image job (e.g., scanning) is to be transmitted, is set as address book information stored in the user device 20.

As described above, on the side of the user device 20, if the image forming apparatus 60 is NFC-tagged on the user device 20, similarly to the custom UI provided by the image forming apparatus 60 described above, a custom UI may also be provided in the user device 20. That is, the user interface unit 1430 of the user device 20 may also provide a custom UI that is similar as those illustrated in FIGS. 7 through 10 described above.

Figure 15:
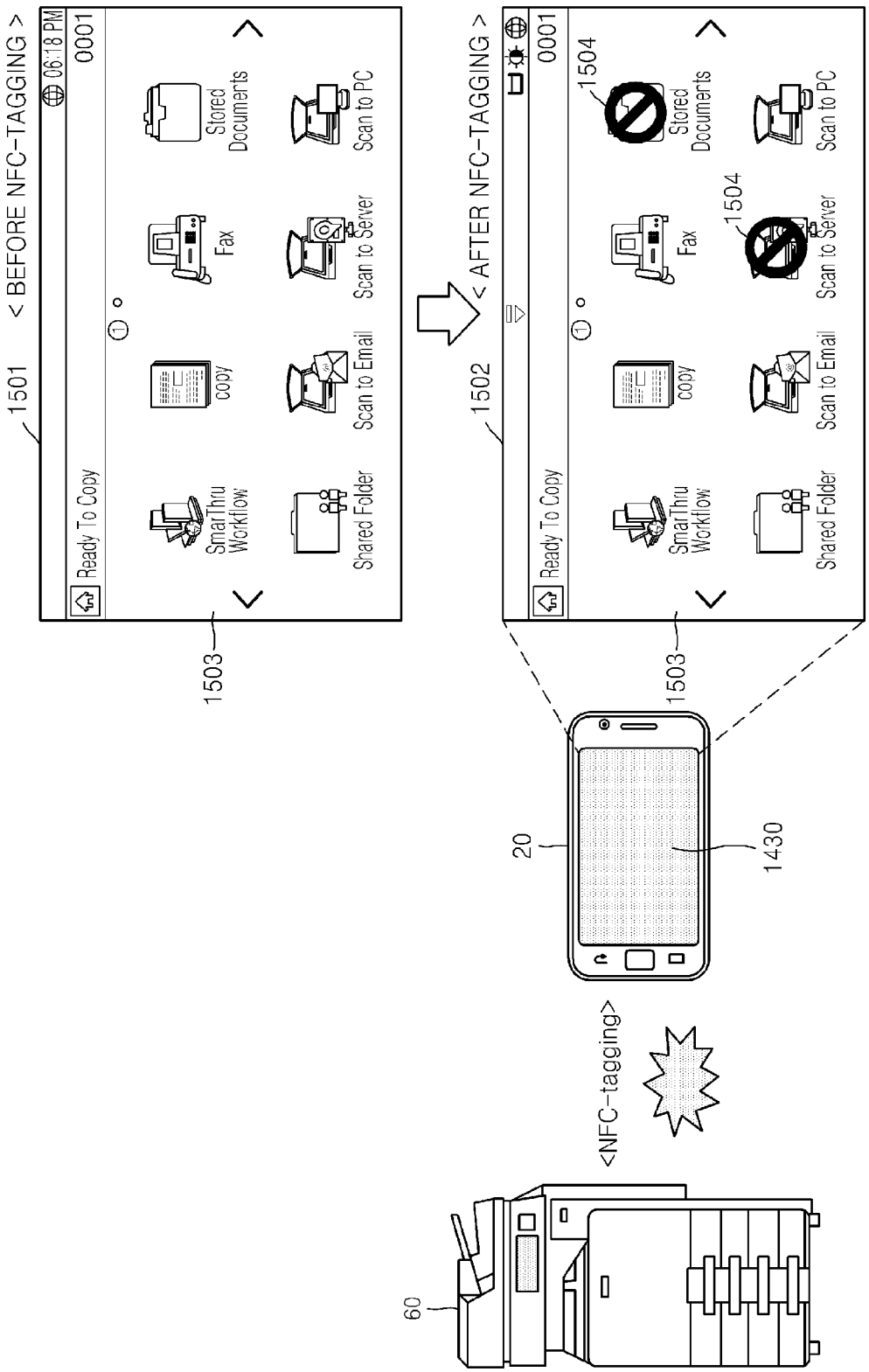
FIG. 15 is a view illustrating a custom UI having a screen configuration corresponding to the image forming apparatus, according to an exemplary embodiment of the present general inventive concept.

FIG. 15 is a view illustrating a custom UI 1502 having a screen configuration corresponding to the image forming apparatus 60, according to an exemplary embodiment of the present general inventive concept.

Referring to FIG. 15, before the image forming apparatus 60 is tagged on the user device 20, a basic UI 1501 is displayed on a user interface unit 1430 of the user device 20. However, when the user device 20 is tagged on the image forming apparatus 60, an execution screen of a printing application is converted on the user interface unit 1430 of the user device 20 such that the custom UI 1502 is displayed.

The custom UI 1502 illustrated in FIG. 15 has a different screen configuration from that of the basic UI 1501. In detail, the custom UI 1502 displays some deactivated menus (icons) 1504, from among menus (icons) 1503 that are activated in the basic UI 1501.

A user of the user device 20 may not be able to use the deactivated menus 1504 in the custom UI 1502. These menus 1504 may be those which are restricted by a manager of the image forming apparatus 60 or which are not supported in the user device 20. That is, the image forming apparatus 60 may not provide image jobs of the menus 1503 to the user device 20 that is NFC-tagged, due to various reasons, and the user of the user device 20 may identify menus (icons) 1503 that are restricted menus (icons) 1504, via the custom UI 1502.

That is, it will be obvious to one of ordinary skill in the art that the user interface unit 1430 of the user device 20 may also provide a custom UI that is similar to those illustrated in FIGS. 7 through 10.

Figure 16:
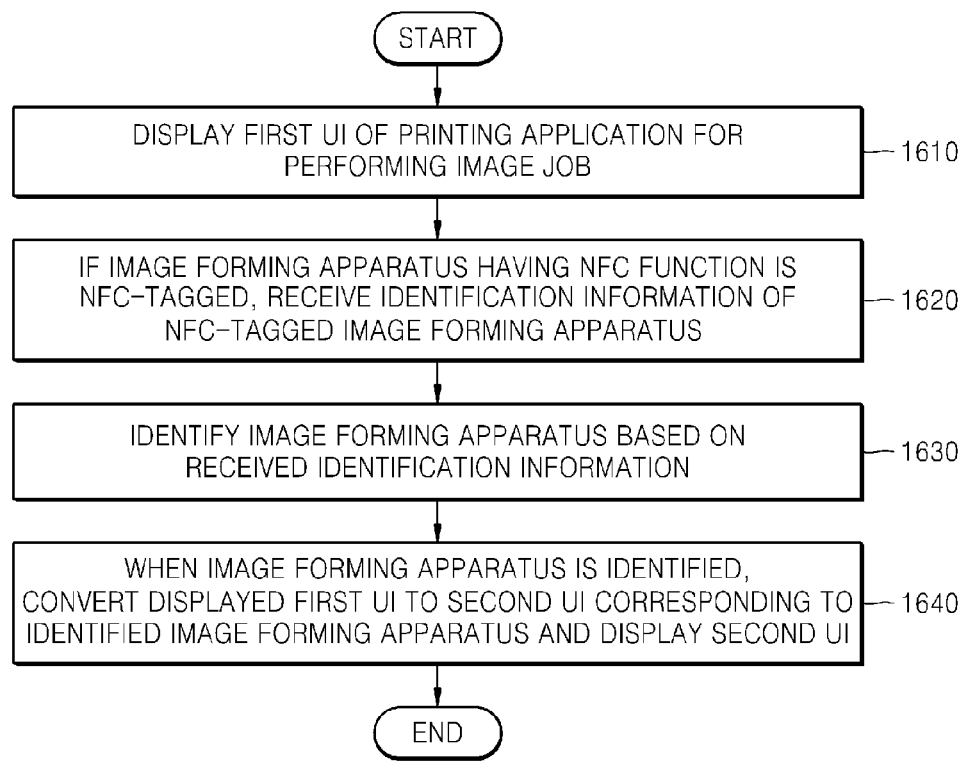
FIG. 16 is a flowchart illustrating a method of providing a UI screen that is customized for an NFC device in an image forming apparatus according to an exemplary embodiment of the present general inventive concept.

FIG. 16 is a flowchart illustrating a method of providing a UI screen that is customized for an image forming apparatus 60 in a user device 20 according to an exemplary embodiment of the present general inventive concept. Referring to FIG. 16, the method of providing a UI screen customized for the image forming apparatus 60 corresponds to processes that are time-sequentially performed in the user device 20 of FIG. 14, and thus, details that are omitted below but have been described with reference to FIG. 14 may also be applied to the method of FIG. 16.

In operation 1610, the user interface unit 1430 displays a first UI (basic UI) of a printing application to perform an image job.

In operation 1620, if the image forming apparatus 60 having an NFC function is NFC-tagged, the NFC module 1420 receives identification information of the image forming apparatus 60 that is NFC-tagged.

In operation 1630, the control unit 1410 identifies the image forming apparatus 60 based on the received identification information.

In operation 1640, when the image forming apparatus 60 is identified, the user interface unit 1430 converts the first UI (basic UI) to a second UI (custom UI) corresponding to the identified image forming apparatus 60 and displays the second UI.

Figure 17:
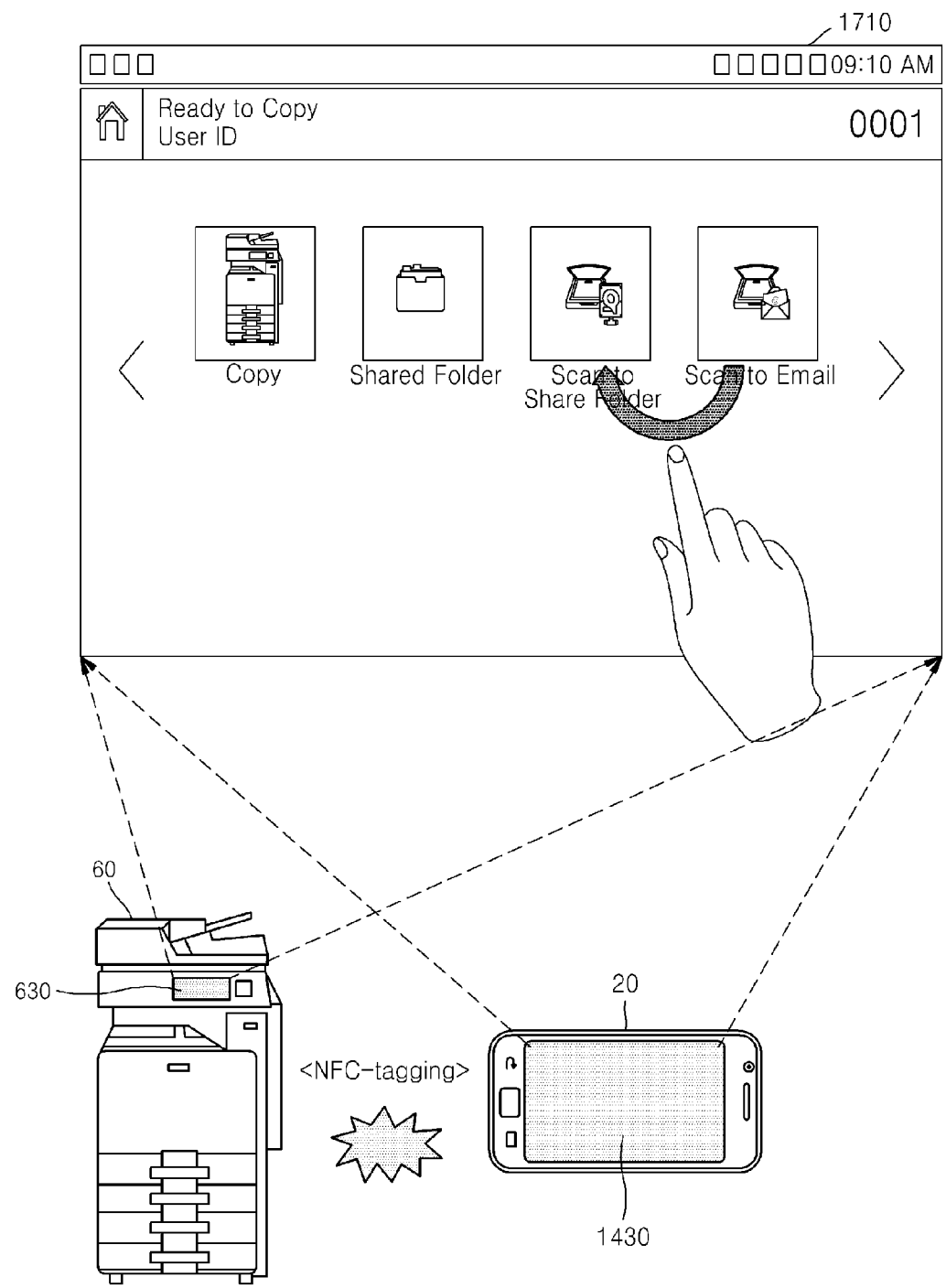
FIG. 17 is a diagram illustrating an operation of creating and editing a custom UI in an NFC device or an image forming apparatus, according to an exemplary embodiment of the present general inventive concept.

FIG. 17 is a diagram illustrating an operation of creating and editing a custom UI 1710 in a user device 20 or an image forming apparatus 60, according to an exemplary embodiment of the present general inventive concept.

Referring to FIG. 17, creating and editing of the custom UI 1710 may be performed in any of the user interface unit 630 of the image forming apparatus 60 and the user interface unit 1430 of the user device 20. The image forming apparatus 60 and the user device 20 may be capable of creating or editing the custom UI 1710 when they are NFC-tagged by each other, but is not limited thereto.

A user may modify the arrangement of menus 1711 of the basic UI via the user interface unit 630 or 1430 as desired. As illustrated in FIG. 17, in exemplary embodiment of such modification, the user may move a menu 1711 to a new location of the custom UI via a touch-and-drag operation.

When creating and editing of the custom UI 1710 is completed, the storage unit 640 of the image forming apparatus 60 or the storage unit 1440 of the user device 20 may store and manage the completed custom UI 1710. Also, the completed custom UI 1710 may be stored and managed in an external server (not illustrated).

Meanwhile, while only an operation of editing the arrangement of menus 1711 is described with reference to FIG. 17, it will be obvious to one of ordinary skill in the art that not only modification of the arrangement of menus but also creating and editing operations such as language set up or background screen set up may be easily conducted via the user interface unit 630 or 1430.

As described above, according to the one or more of the above exemplary embodiments of the present general inventive concept, a custom UI that is customized for a predetermined NFC device or that is personalized to a user of a predetermined NFC device may be displayed just by NFC tagging of an image forming apparatus and an NFC device.

Thus, a UI screen that is convenient for the user of the NFC device may be provided. In addition, a manager of the image forming apparatus may easily set up restrictions regarding image job options with respect to the user of the NFC device by using the custom UI displayed on the image forming apparatus. Furthermore, the user of the NFC device does not have to set up image job options one by one but may conveniently and easily set image job options just by NFC tagging.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory, a read-only memory (ROM), a random-access memory (RAM), a USB memory, a memory card, a Blu-Ray disc, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

While this present general inventive concept has been particularly illustrated and described with reference to a few exemplary embodiments thereof, it will be appreciated by those of ordinary skill in the art that changes may be made in these exemplary embodiments without departing from the principles and spirit of the present general inventive concept, the scope of which is defined in the appended claims and their equivalents. The exemplary embodiments should be considered in descriptive sense only and not for purposes of limitation. Therefore, the scope of the present general inventive concept is defined not by the detailed description of the present general inventive concept but by the appended claims, and all differences within the scope will be construed as being included in the present general inventive concept.

What is claimed is:

1. An image forming apparatus supporting a near field communication (NFC) function, the image forming apparatus comprising:
   a display;
   at least one processor; and
   a transceiver to receive an NFC signal, including identification information of a user device, from the user device after detecting the user device using the NFC function,
   wherein the at least one processor:
      controls the display to display a first UI,
      identifies the user device based on the received identification information,
      converts the displayed first UI to a second UI corresponding to the identified user device, the converting comprising modifying a screen configuration of menus displayed on the first UI to a screen configuration including image job options that are customized for a type of the identified user device,
      controls the display to display the second UI, and
      receives a user instruction to operate the image forming apparatus based on a user input on the second UI.

2. The image forming apparatus of claim 1, wherein the displayed second UI comprises a screen configuration where at least one of an arrangement, a shape, a language set up, or a background screen of the menus is modified from the first UI to be customized for the identified user device.

3. The image forming apparatus of claim 1,
   wherein at least one menu among the menus displayed on the first UI is not allowed for the identified user device, and
   wherein the displayed second UI comprises a screen configuration in which the at least one menu is deactivated.

4. The image forming apparatus of claim 1, wherein the displayed second UI includes a menu customized based on types of applications installed in the identified user device.

5. The image forming apparatus of claim 4,
   wherein the applications installed in the identified user device include a cloud application that provides a cloud function, and
   wherein the displayed second UI includes a menu to execute an operation of transmitting an image scanned by using the image forming apparatus to a cloud connected to the cloud application.

6. The image forming apparatus of claim 1, wherein the customized image job options comprise options that restrict a usage range of an image job available in the identified user device.

7. The image forming apparatus of claim 1, wherein the customized image job options comprise options that set a target to which a result of an image job is to be transmitted as address book information stored in the identified user device.

8. The image forming apparatus of claim 1, wherein the at least one processor, when the user device is identified:
   synchronizes an application included in the identified user device with the image forming apparatus and the identified user device, and
   provides a menu on the second UI to synchronize the application.

9. The image forming apparatus of claim 1,
   wherein the identification information comprises at least one of international mobile station equipment identity (IMEI), an integrated circuit card identifier (ICCID), a media access control (MAC) address, an internet protocol (IP) address, a phone number, or a personal identification number (PIN) of the user device, and
   wherein the at least one processor identifies the user device by comparing a list of identification information stored in advance in a storage unit included in the image forming apparatus or in an external server, with the received identification information.

10. A non-transitory computer readable medium storing computer readable instructions that control at least one processor to implement a method of providing a user interface (UI) screen that is customized for a near field communication (NFC) device in an image forming apparatus supporting an NFC function, the non-transitory computer readable medium comprising:
   instructions to display, by a display, a first UI;
   instructions to receive, when a user device is detected using the NFC function, an NFC signal including identification information of the user device from the user device;
   instructions to identify the user device based on the received identification information;

instructions to convert the displayed first UI to a second UI corresponding to the identified user device;
instructions to display, by the display, the second UI; and
instructions to receive a user instruction to operate the image forming apparatus based on a user input on the second UI,
wherein the second UI is converted by modifying a screen configuration of menus displayed on the first UI to a screen configuration including image job options that are customized for a type of the identified user device.

11. A non-transitory computer readable medium storing computer readable instructions that control at least one processor to implement a method of providing a user interface (UI) screen that is customized for an image forming apparatus in a near field communication (NFC) device supporting an NFC function, the non-transitory computer readable medium comprising:
instructions to display, by a display, a first UI of a printing application to execute an image job;
instructions to receive, when an image forming apparatus is detected using the NFC function, an NFC signal including identification information of the image forming apparatus from the image forming apparatus;
instructions to identify the image forming apparatus based on the received identification information;
instructions to convert the displayed first UI to a second UI corresponding to the identified image forming apparatus;
instructions to display, by the display, the second UI; and
instructions to receive a user instruction to operate the identified image forming apparatus based on a user input on the second UI,
wherein the second UI is converted by modifying a screen configuration of menus displayed on the first UI to a screen configuration including image job options that are customized for a type of the identified of image forming apparatus.

* * * * *